May 19, 1953  F. C. KEMBER  2,638,997
WHEEL EMERGENCY EQUIPMENT
Filed May 13, 1947  14 Sheets-Sheet 1

*INVENTOR.*
FEDERICO CARLOS KEMBER
BY
ATTORNEY

May 19, 1953 F. C. KEMBER 2,638,997
WHEEL EMERGENCY EQUIPMENT
Filed May 13, 1947 14 Sheets-Sheet 4

*INVENTOR.*
FEDERICO CARLOS KEMBER
BY
ATTORNEY

May 19, 1953 F. C. KEMBER 2,638,997
WHEEL EMERGENCY EQUIPMENT
Filed May 13, 1947 14 Sheets-Sheet 5

INVENTOR.
FEDERICO CARLOS KEMBER
BY
ATTORNEY

May 19, 1953  F. C. KEMBER  2,638,997
WHEEL EMERGENCY EQUIPMENT
Filed May 13, 1947 14 Sheets-Sheet 6

INVENTOR.
FEDERICO CARLOS KEMBER
BY
ATTORNEY

May 19, 1953 F. C. KEMBER 2,638,997
WHEEL EMERGENCY EQUIPMENT
Filed May 13, 1947 14 Sheets-Sheet 7
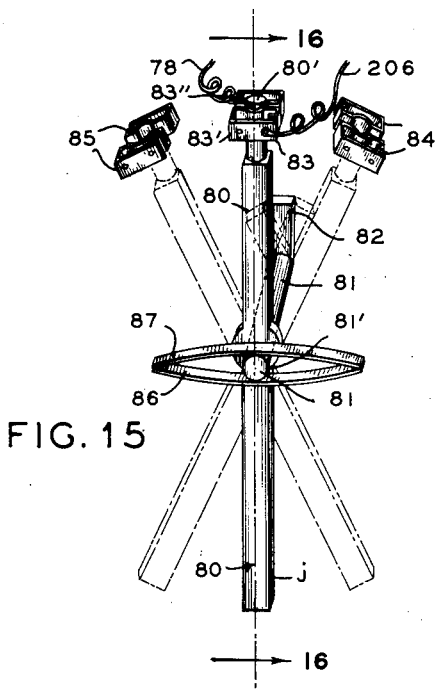
FIG. 15
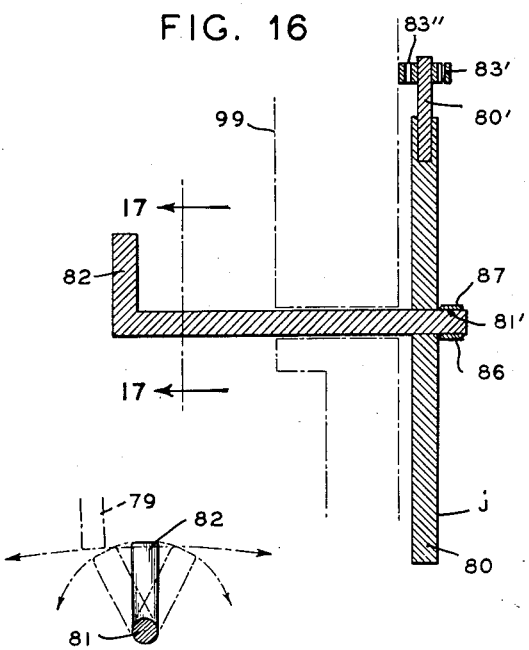
FIG. 16
FIG. 17
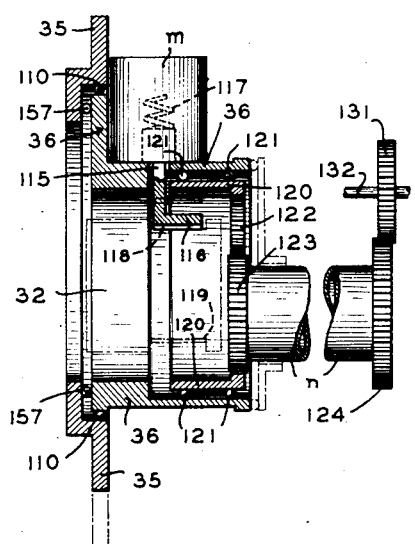
FIG. 22
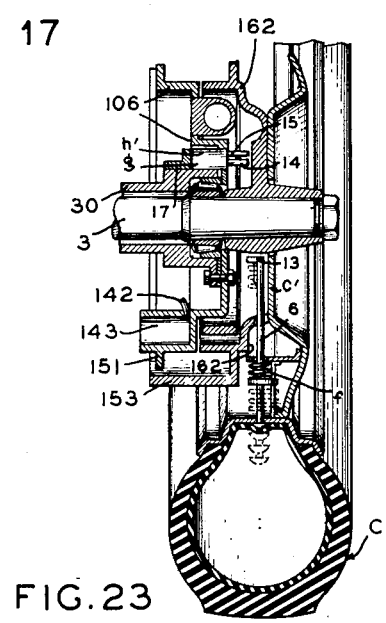
FIG. 23
*INVENTOR.*
FEDERICO CARLOS KEMBER
BY
ATTORNEY May 19, 1953  F. C. KEMBER  2,638,997
WHEEL EMERGENCY EQUIPMENT
Filed May 13, 1947  14 Sheets-Sheet 8

INVENTOR.
FEDERICO CARLOS KEMBER
BY
ATTORNEY.

May 19, 1953  F. C. KEMBER  2,638,997
WHEEL EMERGENCY EQUIPMENT
Filed May 13, 1947  14 Sheets-Sheet 10

INVENTOR,
FEDERICO CARLOS KEMBER
BY
ATTORNEY

May 19, 1953 F. C. KEMBER 2,638,997
WHEEL EMERGENCY EQUIPMENT
Filed May 13, 1947 14 Sheets-Sheet 11

INVENTOR.
FEDERICO CARLOS KEMBER
BY
ATTORNEY

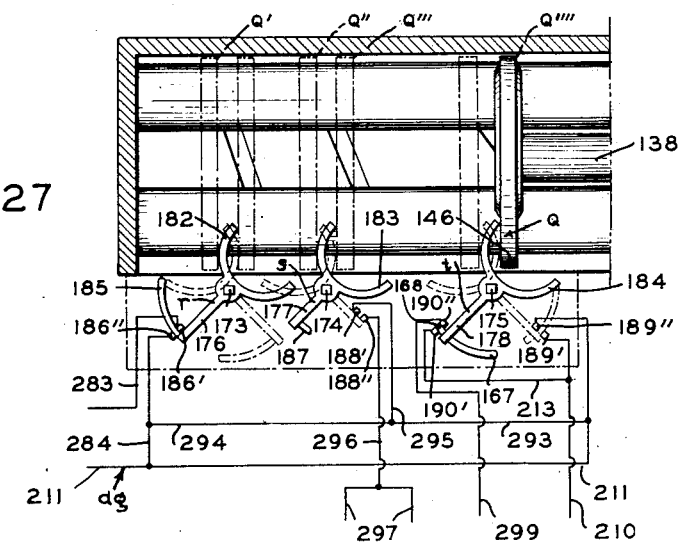
FIG. 27
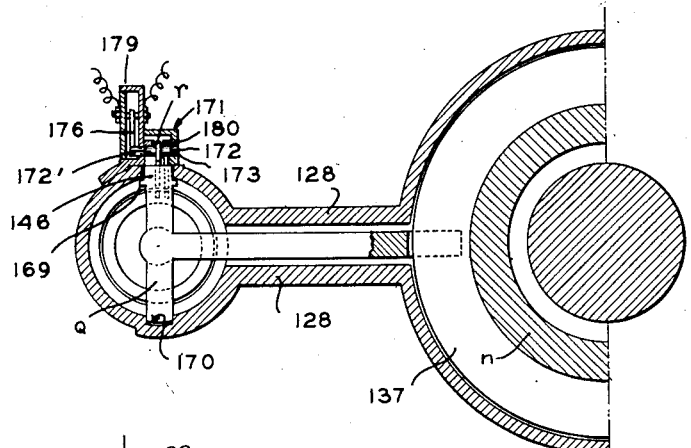
FIG. 28
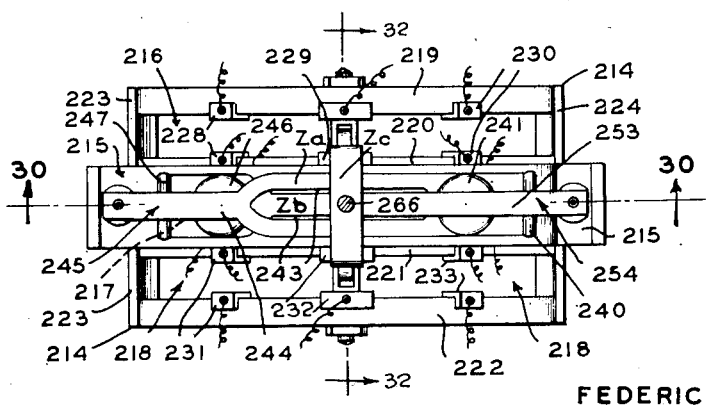
FIG. 31
FIG. 29
INVENTOR
FEDERICO CARLOS KEMBER
BY
ATTORNEY May 19, 1953  F. C. KEMBER  2,638,997
WHEEL EMERGENCY EQUIPMENT
Filed May 13, 1947  14 Sheets-Sheet 13

INVENTOR.
FEDERICO CARLOS KEMBER
BY
ATTORNEY

INVENTOR.
FEDERICO CARLOS KEMBER

Patented May 19, 1953

2,638,997

UNITED STATES PATENT OFFICE 2,638,997

WHEEL EMERGENCY EQUIPMENT

Federico Carlos Kember, Buenos Aires, Argentina

Application May 13, 1947, Serial No. 747,694

16 Claims. (Cl. 180—15)

This invention relates to a wheel emergency equipment for vehicles in general.

As it is well known, the normal run of a vehicle may be affected by many factors, and particularly through lack of balance resulting from wheel skidding and tire punctures.

Amongst other, attempts to counteract the effects of tire deflation have been directed to means for supplying air, which, while theoretically acceptable, have not proved successful in practice.

On the other hand, in order to avoid sliding or skidding, the general tendency is to apply chains or other devices to the treads. These, although effective, can be used only on soft roads, inasmuch as for general use, such anti-skid devices would only be practical if they could be combined with means for readily attaching and detaching same.

Therefore, and in view of the difficulties encountered in the application of direct auxiliary means to the vehicle wheels, I have devised a wheel emergency assembly, wherein each main or road engaging wheel of the vehicle is provided with an auxiliary wheel displaceable about the main wheel axle, occupying at least two positions thereby being retractile in one, and operative in another in case of failure of the main wheel.

For this purpose, each of the main wheels of the vehicle is provided with a mechanical device assuming a given non-operative position when the tire is under normal pressure; device which is capable of being displaced to an operative position when said pressure drops a certain degree, producing an effect which places said auxiliary wheel in contact with the ground, to support the vehicle.

Apart from being automatically responsive to punctures or deflations of the main wheel tires, said supplementary wheels may be rendered operative, at will, in case of emergency, and particularly when the vehicle is moving on slippery ground, so as to prevent skidding and secure stability of the vehicle, inasmuch as said supplementary wheels may be coupled to the vehicle engine.

Therefore, one of the main objects of the invention is to provide safety means capable of rendering an auxiliary wheel operative upon deflation or failure of the tire of the corresponding main wheel.

A further object of the invention is to minimize the danger of rolling over or undue deviations of the vehicle, inasmuch as either automatically or under the driver's control, the auxiliary or emergency wheels will become operative so as to secure the stability of the vehicle until the latter is brought to a stop. Said auxiliary wheels may also substitute the main wheels for driving the vehicle to a service station.

A further object of the invention is to provide means which will enable the driver to set in operation the anti-skidding means when the vehicle is running on slippery or muddy grounds, without having to leave his seat, inasmuch as he can render the auxiliary wheels operative while the vehicle is moving on such grounds, and also retract them when the ground is normal, so that the vehicle may again be supported by the normal wheels.

A still further object is to provide a system whereby the vehicle may act on any kind of ground, even on ice or snow, for which purpose said auxiliary wheels may be provided with special treads.

A still further object of the invention is to provide means for increasing the braking capacity of an automotive vehicle equipped with auxiliary wheels, whenever the brakes are applied with said auxiliary wheels in operation, due to the increased wheel surface in contact with the ground, which will increase adherence and thereby reduce skidding.

Other objects and advantages of this invention will become apparent from the course of the following detailed description, when read in conjunction with the accompanying drawings, illustrating preferred embodiments of the invention by way of example, and wherein:

Fig. 15 is a perspective view of the switch interpolated in the circuit of the electromagnet controlling the auxiliary road-wheels shown in Figs. 11, and 13;

Fig. 16 is a sectional view of a detail of the switch shown in Fig. 15, taken along the lines 16—16 of Fig. 15;

Fig. 17 is a detailed sectional view taken along the lines 17—17 of Fig. 16;

Fig. 22 is a schematic section of the control mechanism through which the eccentric position of the auxiliary wheel becomes concentric;

Fig. 23 is a schematic detail of the required position of the electric switches responsive to the action of the automatic device depending on the deflation of the tire corresponding to the main driving wheel;

Fig. 27 is a schematic view of the casing in which are found the emergency switches interpolated in the different circuits for the operation driving wheels;

Fig. 28 is a cross-sectional view taken along the lines 28—28 of Fig. 6 and schematically showing the mounting of the slider controlling the switches shown in Fig. 27;

Fig. 29 is a detailed view of the switch shaft according to one of the embodiments, for defining the two positions required for the operation thereof, according to the action of the slider;

Fig. 31 is a top view of a hand actuated commutator switch;

The same reference characters are used to indicate like or corresponding parts or elements throughout the drawings.

Figure 1:
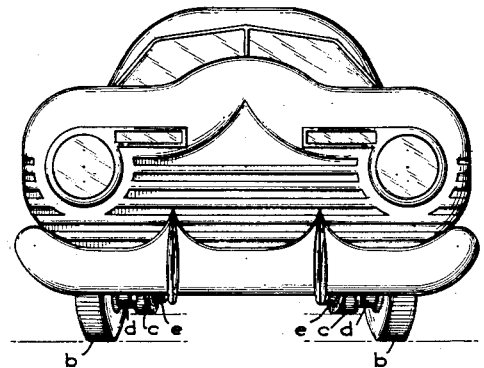
Fig. 1 is a front view of an automotive vehicle equipped with emergency or supplementary wheels associated with the main road engaging wheels, showing the auxiliary wheels in retracted or inoperative position.

As may be seen in the drawings, $a$ is the chassis of the vehicle, $b$ are the front or road-wheels and $c$ the rear wheels which in this instance are the driven wheels inasmuch as the corresponding engine 1 of the vehicle derives the action thereof towards the differential 2 (Figs. 6 and 34) from which the half-axles 3 extend to the respective wheels $c$.

Each of said front wheels $b$ is provided with a supplementary wheel $d$, while each of the driving wheels $c$ is provided with an auxiliary wheel $e$ forming with said auxiliary wheels $d$ the equipment subject of this invention and actuated through an electric circuit to be described hereinafter.

Broadly, the invention comprises a wheel emergency equipment combined with electric circuits which are normally open and which are automatically closed upon a reduction in the fluid pressure in the tires, through puncture or other failure, so as to set into operation the auxiliary wheels. In certain cases, the driver may place said auxiliary wheels into operation at will, by means manually action operated, capable of closing said circuits.

In order to warn the driver of such failures, the equipment also comprises an optical and sound alarm system acting a certain time before the auxiliary or emergency wheels are placed in operation.

Figure 2:
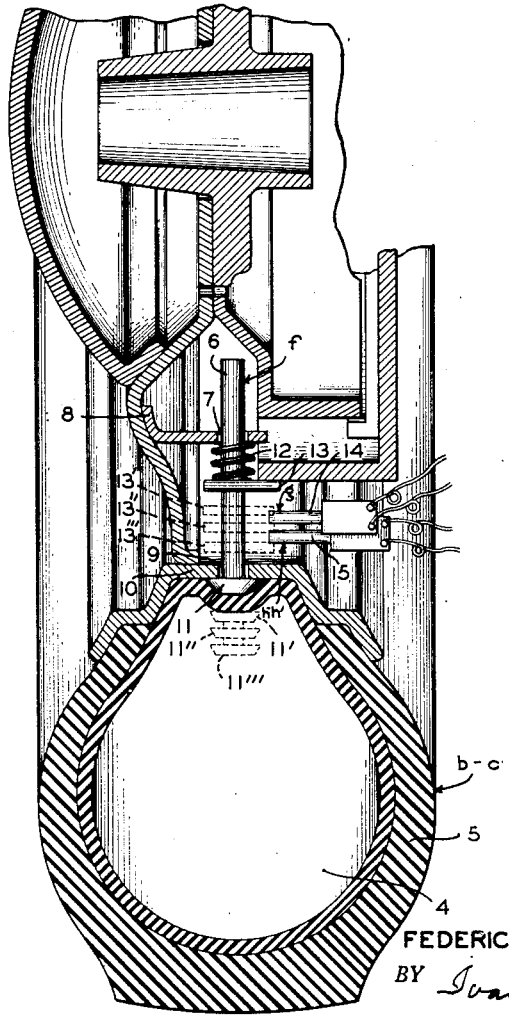
Fig. 2 is a radial section of a vehicle wheel, showing the device responsive to the fluid pressure in the tire.

The automatic closure of said circuits is obtained through the action of a device indicated at $f$ and particularly shown in Fig. 2. Each main wheel $b$ or $c$ is provided with at least one of the devices $f$. Said device $f$ is classified as automatic inasmuch as it is combined with the wheel tire so that a drop in pressure in the inner tube 4, the tire of which is indicated at 5, whether through leakage or puncture, will place in operation the corresponding auxiliary wheel $d$ of the main wheels $b$, and $e$ of the main wheels $c$.

Said automatic device $f$ comprises a stem 6 adapted in a guide 7 of a bracket 8, and as may be seen in the drawings, said stem 6 passes through the rim 10 by means of a perforation 9 and ends in a shoe 11 engaging the inner tube 4 of the wheel tire. Stem 6 is urged radially by spring 12, the resistance of which is overcome by the normal pressure in the inner tube, so that said stem 6 and shoe 11 are normally held in the position shown in full lines. As the tension of said spring 12 is capable of overcoming the pressure in the tire when said pressure falls below a predetermined value, upon a sufficient drop in the fluid pressure the spring tension prevails and overcomes the walls of the inner tube 4, with a corresponding displacement of stem 6 and shoe 11 thereof. Consequently, in the case of a puncture or a loss of part of the fluid contained in said inner tube 4, said stem 6 will be displaced to the positions shown in dotted lines in Figs. 2, 11 and 19.

Stem 6 is provided with a stud 13 rotating with the wheel, so that on being radially displaced it will successively strike against levers 14 and 15 holding switches $g$ and $h$ in open position. Both switches $g$ and $h$, together with levers 14 and 15 are mounted on a bracket 16 on wheels $b$ (Fig. 11) and 17 on wheels $c$ (Fig. 23). Both brackets will be described in detail hereinafter.

Switches $g$ and $h$ are of the same construction. Switches $h$ of the driving wheels $c$ differ from those of the road-wheels $b$ in their electric connections and are therefore identified as switches $h'$. Switch $g$ is shown in Fig. 3, switch $h$ in Fig. 4 and switch $h'$ in Fig. 5.

Figure 3:
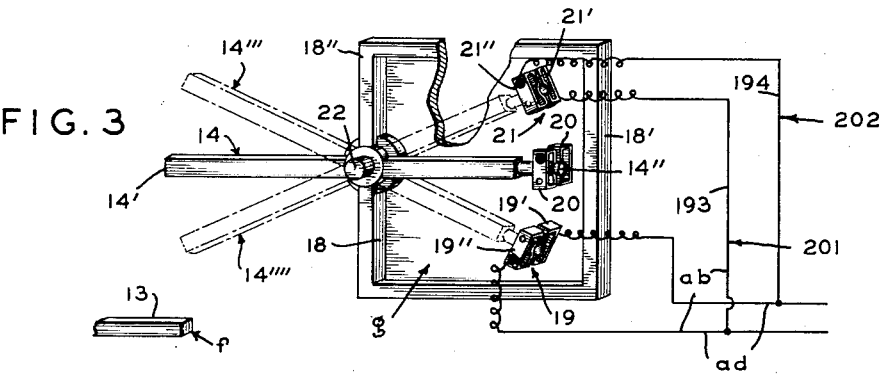
Fig. 3 is a perspective view of one of the switches responsive to the action of the automatic device shown in Fig. 2 and corresponding to the closure of the alarm device circuit.

Switch $g$, Fig. 3, comprises a casing 18 containing three pairs of resilient fingers 19, 20 and 21, located near the wall 18' of casing 18. Lever 14 of casing 18 extends through the wall 18'' of said casing and is pivoted at 22. The end 14' of said lever is located within the path of stud 13 of device $f$, as will be explained later.

The end 14'' of lever 14 is made of conductive material and is electrically insulated from the remainder of lever 14. During the angular displacement of said lever, the end 14'' thereof will register with the pairs of fingers 19, 20 and 21. The fingers forming each pair are spaced by a distance which is smaller than the thickness of said end 14'', but inasmuch as said fingers are resilient, they are capable of receiving said end 14'', which enters therebetween with a wedge action and is effectively held between the pairs of fingers 19, 20 or 21. The pairs of fingers 19 and 21 are contacts of switch $g$.

The purpose of the two fingers 20 which are centrally located, is to hold lever 14 in an intermediate or normal position, shown in full lines in Fig. 3. Each of the contact fingers 19 and 21, together with the end 14'' of lever 14, forms a switch in a single electrical circuit. Thus, when lever 14 is in the position 14''', the end 14'' thereof will be interposed between the two contacts 19 and will act as an intermediary for closing the circuit, whereas when said lever 14 assumes the position 14'''', the end 14'' thereof will be interposed between the two contacts 21 and will act so as to close the same circuit.

Switch $h$ (Fig. 4) which is similar to switch $g$, comprises a casing 23 against the wall 23' of which are arranged in an arc the pairs of fingers 24, 25 and 26. A lever 15 extends through the wall 23'' of said casing and the end 15' thereof is located in the path of stud 13 of the device $f$. Said lever 15 is pivoted at 27.

The end 15'' of lever 15 is made of conductive material and is electrically insulated from the remaining portion of lever 15. In the angular displacement of said lever, the end 15'' thereof registers with the pairs of fingers 24, 25 and 26. The fingers forming each pair are spaced by a distance which is smaller than the thickness of said end 15'', but inasmuch as said fingers are resilient, they are capable of receiving said end 15'' which enters and is effectively held between them with a wedging action.

Figure 4:
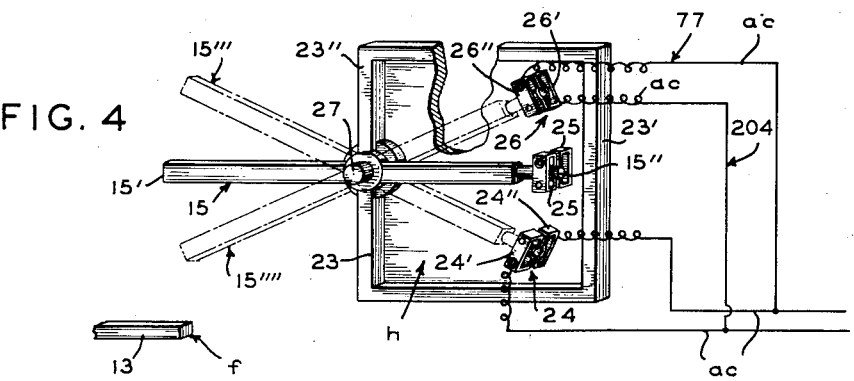
Fig. 4 shows a further switch responsive to the action of the automatic device shown in Fig. 2, said switch corresponding to the automatic operation of the supplementary vehicle wheels.

The pair of fingers 25 which are centrally located are intended to hold the lever 15 in the intermediate or normal position shown in full lines in Fig. 4, whereas each of the remaining pairs 24 and 26 forms, together with said end 15'', a switch for a single circuit. Thus, when lever 15 assumes the position 15''', the end 15'' interposed between fingers 24 acts as an intermediary in closing the circuit, whereas when lever 15 assumes the position indicated at 15'''', the end 15'' interposed between fingers 26 acts so as to close the same electric circuit.

When the tire of wheel $b$ or $c$ is under normal pressure, it will hold spring 12 contracted and thus stud 13 will be held in the inoperative position shown in full lines in Fig. 2, whereby upon wheel $b$ or $c$ being rotated, said stop 13 will also rotate together with device $f$ and will not engage levers 14 and 15. Lever 14 is located at a point adjacent the inoperative position of stud 13, while lever 15 is located at another point further away from the wheel axle.

When the fluid pressure in tire 4 decreases sufficiently, spring 12 will overcome the tire pressure and cause the displacement of stem 6 which forms part of device $f$ and rotates with wheel $b$ or $c$, and inasmuch as levers 14 and 15 are associated with fixed casings, upon stud 13 reaching the position 13' corresponding to the circular path in which the end of lever 14 is located, it will engage and shift same from the position 14 shown in full lines in Fig. 3 to the position 14''' shown in dotted lines, when the vehicle is moving forward; said end 14'' remaining as a bridge between the contacts of pair 19; or towards position 14'''' when the vehicle is moving backwards, in which case the end 14'', of lever 14 will close the circuit between the pair of contact fingers 21. As may be seen in Fig. 3, when lever 14 assumes either of these positions 14''' or 14'''', it will remain out of reach of stud 13. Both positions imposed by stud 13 close the automatic alarm circuit, the elements of which will be described hereinafter.

If the fluid pressure continues to fall, stem 6 with shoe 11 reaches position 11'' (Fig. 2) wherein stud 13, assuming position 13'', engages lever 15, shifting same to cause the closure of the circuit, thereby moving the corresponding auxiliary wheel from the inoperative to the operative position thereof.

Switches $g$ and $h$, described above, correspond only to the automatic action. Inasmuch as switch $h'$ acts in exactly the same manner as switch $h$ as regards the automatic circuit, it has been given the same reference characters as switch $h$; it only differs from the latter in that the pair of intermediary fingers 25 of switch $h'$ does not act as a simple holding means but also as a switch for the electric circuit for operating the equipment at will.

As stated hereinbefore, the purpose of the equipment is to provide each main wheel of the vehicle with an auxiliary wheel capable of replacing same and of performing all the functions corresponding to a main wheel, whereby the driver may run the vehicle on the auxiliary wheels, if necessary, until he finds suitable time and place to repair the failure. Also, said auxiliary driving wheels may, as already stated, act as complementary wheels, as the driver may at any time set said auxiliary wheels into operation through hand controlled commutating means.

In order that an auxiliary wheel may act as effectively as a main wheel, it should be similar or substantially similar to said main wheel, i. e. it should be of sufficient diameter for a normal rolling and capable of acting as a road-wheel when replacing a road-wheel, and as a driving wheel when replacing a main driving wheel.

For this purpose, the auxiliary wheels $d$ and $e$ are so arranged as to have within their perimeter the axle of the main wheel, and in view of the mounting thereof, they are capable of assuming two positions, viz; an eccentric position relative to the center of the axle of the main wheel, said eccentricity being in a direction opposite the ground relative to the axle; this position corresponds to the retracted or inoperative position of the auxiliary wheel. The other position is a concentric position, or a position of slight eccentricity relative said axle of the main wheel and corresponds to the operative position of the auxiliary wheel.

Figure 7:
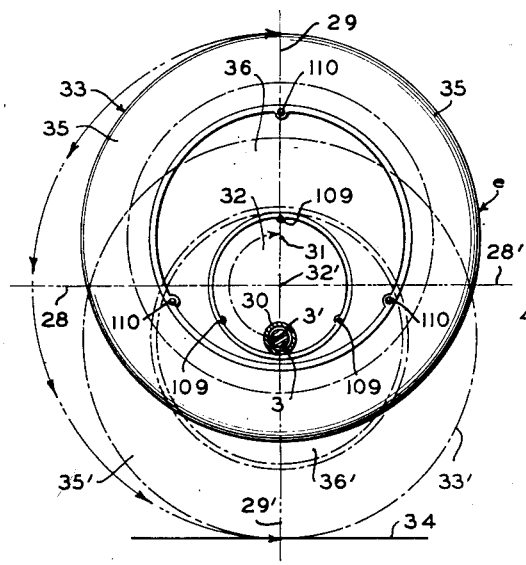
Figs. 7, 8 and 9 show three different examples of the mounting means for the auxiliary wheels, illustrating different ways of securing the passage thereof from an eccentric to a concentric position relative to the main wheels and viceversa.
Figure 9:
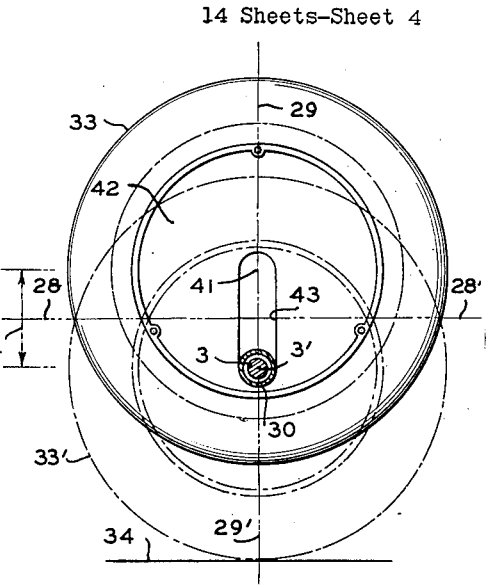
Figure 8:
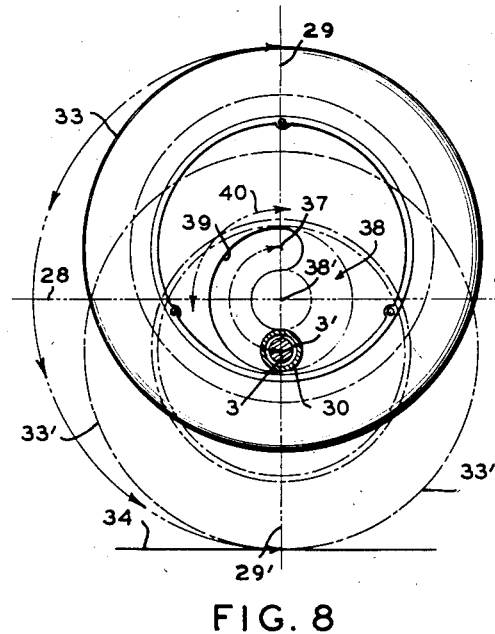
Figure 10:
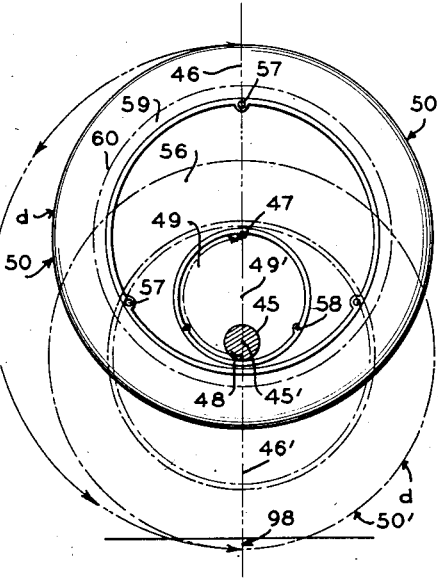
Fig. 10 is a schematic view of a further modification of the mounting means for the auxiliary wheel, similar to that shown in Fig. 7 but for passing from a position of considerable eccentricity to a position of slight eccentricity relative to the main wheel.

The schematic representations of Figs. 7, 8 and 9 show three embodiments of the mounting means for the auxiliary wheel, with different means for shifting same from the eccentric to the concentric position relative to the main wheel. The schematic representation of Fig. 10 shows a further embodiment of a mounting means similar to that of Fig. 7 but for shifting from a position of considerable eccentricity to one of slight eccentricity relative to the main wheel.

In the embodiment of Fig. 7, the reference numeral 3 indicates the cross-section of an axle, the center 3' of which is given by the intersection of lines 28—28' and 29—29'. Said axle is surrounded by a jacket 30.

The desired degree of eccentricity is the distance between point 3' and point 31 along line 29—29'. One half of this magnitude is taken, and starting from point 3', point 32' is marked in the direction of the desired eccentricity. A circle is traced, taking point 32' as the center, with a radius equal to the distance 3'—32' plus one-half the diameter of axle 3 with jacket 30 thereof. This circle is materialized by the core 32 of the eccentricity, said core being fixed to jacket 30 and therefore not movable. Now, with the center at 31 and the radius of the auxiliary wheel, a circumference is traced, indicated at 33, which represents the tread of said auxiliary wheel.

If this circumference 33 with its center at 31 by revolved 180° about the fixed core 32, so as to assume the position shown in dotted lines 33' where it contacts line 34 representing the ground, the imaginary center thereof would pass from point 31 to point 3', thus becoming concentric relative to axle 3. If an annular band 35, having a circumference 33, is capable of rotating on the central part 36 of said circumference 33, the band 35 would become a wheel proper. In the position shown in dotted lines 36', said part 36 will constitute the axis of rotation for said band 35. The entire portion shown in dotted lines corresponds to the operative position of the wheel, while the portion shown in full lines corresponds to the retracted or inoperative position.

Fig. 8 shows a different mounting means capable of producing the same result of that illustrated in Fig. 7. The point 3', given by the intersection of lines 28—28' and lines 29—29' is the center of the section of an axle 3. Point 37, on 29—29' represents the imaginary center of a supplementary wheel when in eccentric or retracted position. Point 38' is the center of an eccentric body 38 having a perforation 39 which is arcuate and of a width slightly larger than that of axle 3.

If said body 38 should rotate about point 38', as indicated by arrow 40, at the end of the travel thereof, it will locate the imaginary point or center 37 registering with the center 3' of axle 3. Thus, the auxiliary wheel, the tread of which is indicated by means of line 33, will pass from an eccentric position shown in full lines, to a concentric position relative to said axle, shown in dotted lines, wherein it will contact the ground line 34.

Fig. 9 illustrates a further system in which the result achieved by the means shown in Figs. 7 and 8, may be obtained. Point 3' determined by the intersection of lines 28—28' and 29—29' is the center of an axle 3. Point 41 is the imaginary center of a wheel the tread of which is indicated at 33 in an eccentric position relative to said axle 3. Reference numeral 42 indicates a circular body having its imaginary center at 41. Should said body 42 have a perforation such as that indicated at 43, with a suitable force acting alternatively in the directions shown by the double arrow 44, it will be capable of passing circumference 33 from eccentricity to concentricity relative to axle 3, and vice-versa.

In the embodiment of Fig. 10, reference numeral 45' indicates the center of axle 45 of the main wheel. In the vertical line 46—46' a point of major eccentricity is determined by numeral 47, while reference numeral 48 indicates a minor eccentricity relative to the center 45'. With the point determined by reference numeral 49' half the distance between points 47 and 48 is defined. Said point 49' is the center of the circle materialized by core 49, within which is comprised the circle corresponding to center 45' of axle 45, which is tangential.

Point 47 constitutes the center of circumference 50 representing the tread of the auxiliary wheels. Upon revolving said circumference 50 towards position 50' indicated in dotted lines, since said shifting is made with the center of rotation at point 49', the center of said circumferential line in the position shown in dotted lines will be point 48, which is less eccentric relative to the center 45' of axle 45.

Of the eccentrical mounting means for the supplementary wheels as explained above, those shown in Figs. 7 and 10 are preferred, inasmuch as they are safer, apart from other advantages for mechanical combinations.

Considering first the road-wheels, in the case of a shift of the auxiliary to the concentric position, because of pneumatic emergency, there would be two wheels contacting the ground on the side of abnormality, viz; the main wheel and the auxiliary wheel. This would cause an overloading of such side on the steering of the vehicle, tending to deviate the direction thereof. If through suitable means both auxiliary road-wheels are lowered, this lack of equilibrium would not occur but, the steering would become much heavier. On the other hand, if the auxiliary wheels are mounted as shown in Fig. 10, the imaginary axis of said auxiliary wheels will shift to a position (48) below the axis of the main wheel at the time of the emergency, and, by lowering both at the same time, the auxiliary wheels will take the place of the main wheels, since the latter will remain out of contact with the ground. The wheels will have thus automatically changed, without deviations of the vehicle and without any difference in steering easeness or behaviour of the auxiliary wheels.

In the case of the driving wheels, it is desirable to have the auxiliary wheels act in place of or as additional to the main wheels, as required by circumstances. In place of the main wheels in case of fluid pressure failure and in addition to the main wheels when it is desired to afford more contacting surface with the ground; hence an improved adherence, thereby providing the possibility of quickly braking the vehicle with less risk of skidding on wet, muddy or snow-covered roads, particularly when the tread of the auxiliary wheel is of suitable composition and structure.

Furthermore, because of less use, this tread will be better preserved than that of the main or normal wheel.

In the case of an excessive load being imposed on the rear axle, the auxiliary wheels can share such load, thereby improving the operation of the vehicle and reducing wear of the main wheels. In the case of trucks, said auxiliary wheels may be retracted when the vehicle is empty or with light freight, thereby avoiding useless wear of the tires. All this is only possible when the auxiliary wheel passes from an eccentric inoperative position to a concentric operative position, thereby becoming supplementary or complementary according to the case.

Figure 11:
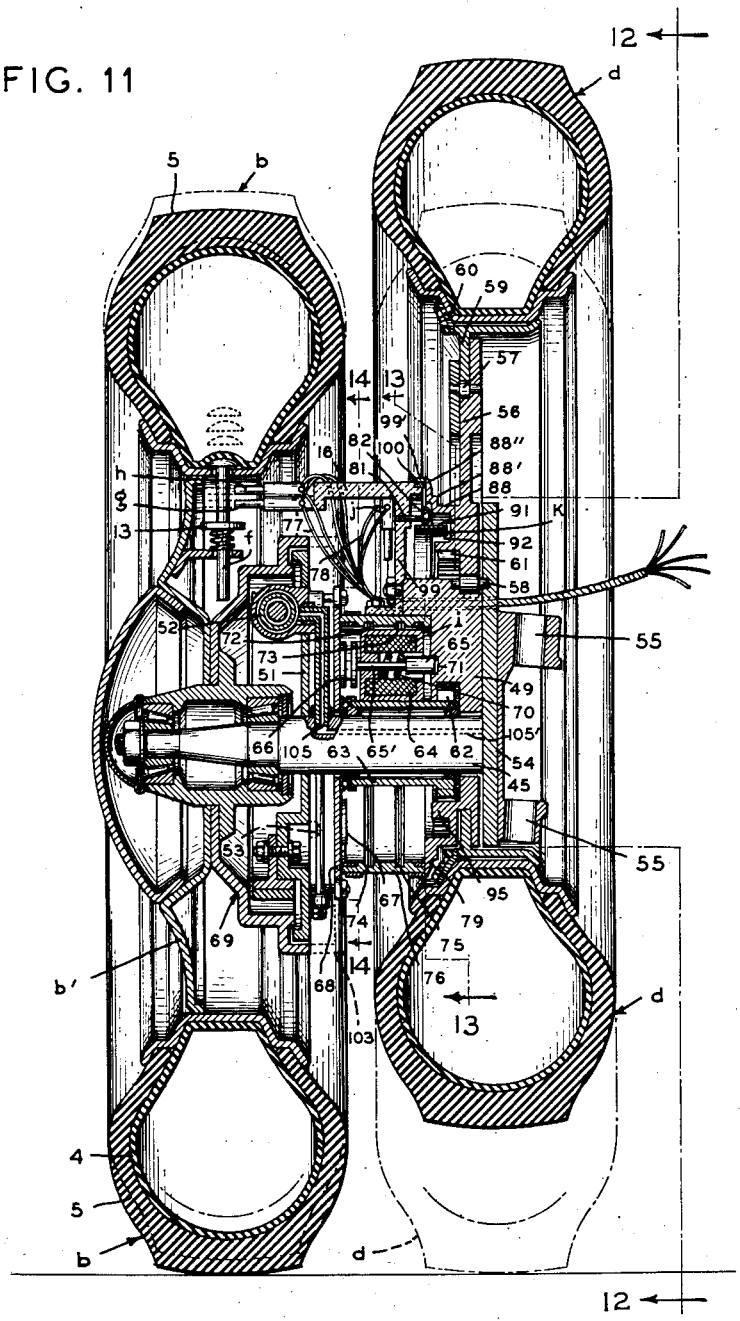
Fig. 11 is a detailed elevational view of one of the road-wheels and the auxiliary wheel therefor, in vertical diammetrical section.

In Fig. 11, showing a road-wheel, it may be seen that the mounting is effected on the end of axle 45 fixed to a plate 51, serving as a base for the brake, comprising cylinder 52 and brake band eccentricity adjusting nuts 53 of wheel b, in the usual manner. However, in order to allow for said auxiliary wheel, said axle end 45 extends inwardly to another plate 54 which is eccentric relative to said axle end 45, and constitutes the fixed base of the supplementary wheel d, said plate 54 having the linkage 55 corresponding to the steering of the vehicle.

Figure 12:
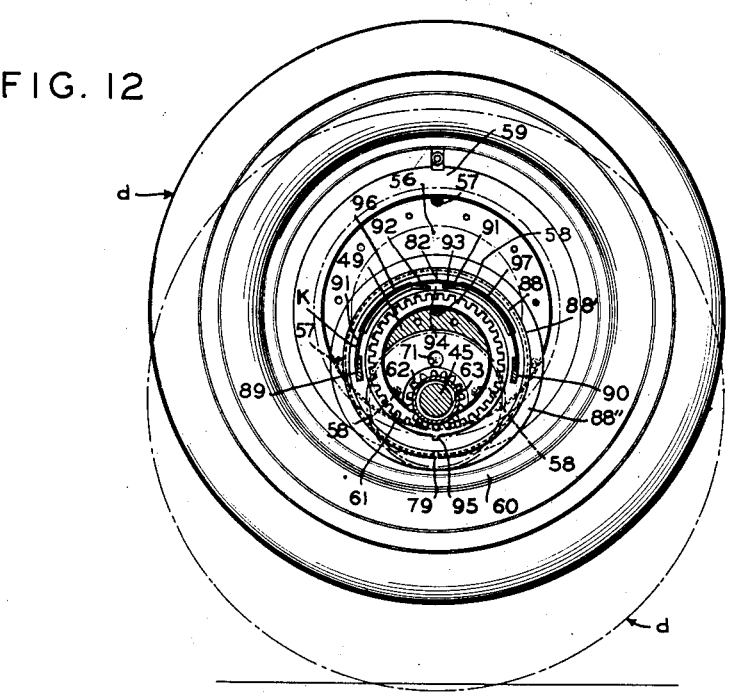
Fig. 12 is a sectional elevation of the outer face of the supplementary wheel, taken along the lines 12—12 of Fig. 11.

As shown in Figs. 11 and 12, the core 49 to which said plate 54 is fixed, is arranged eccentrically relative to axle end 45 and wheel b. Said core 49 constitutes the mounting means for the auxiliary wheel d, but in an indirect manner since a disc 56 is interposed between core 49 and said wheel. Disc 56 is eccentrically mounted on core 49 and by means of balls or rollers 57, allows the free rotation of the respective wheel d. Said disc 56 is associated with core 49 by means of balls or rollers 58.

The rotary portion of wheel d comprises an annular piece 59 adapted to disc 56 by means of said balls 57, while on the other hand said annular piece 59 adapts a rim 60 serving to support the tire of wheel d.

Inasmuch as said core 49 acts as an eccentric shaft for disc 56, said disc is capable of rotating 180°, so as to change the direction of the eccentricity relative to the center 49', whereby wheel d may be shifted from the inoperative position shown in full lines in Figs. 11 and 12, to the operative position indicated in dotted lines in said figures, wherein the center of wheel d will be near the center 45' of the axle end 45.

Figure 13:
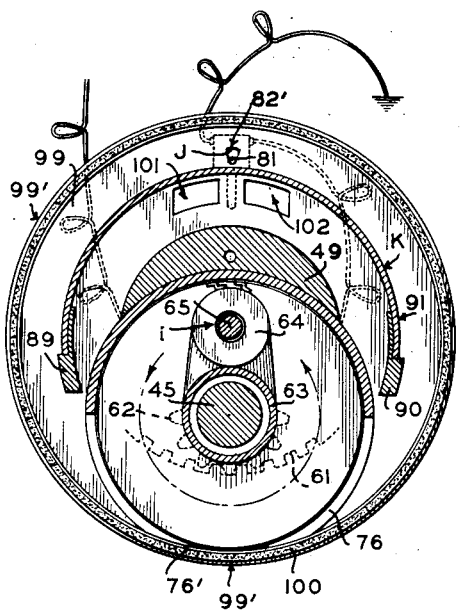
Fig. 13 is a sectional elevation taken along the lines 13—13 of Fig. 11.

In order to effect this change or motion, said disc 56 is provided with a gear 61 the teeth of which are directed towards the center thereof. As shown in Figs. 11, 12 and 13, said gear 61 meshes with a pinion 62 fixed to a tubular shaft 63 mounted rotatably about the shaft end 45 and carrying an electromagnet i the coil 64 of which is provided with an axial perforation housing a movable core 65 having a stem 65' provided with a fin 66 opposite a meshing crown 67. Said crown 67 is attached to plate 68 forming part of the rotary frame of wheel b.

The rotary frame b' of wheel b comprises the usual brake drum 69 enclosing the brake members mounted on plate 51.

The core 65 of electromagnet i is urged by means of a spring 70 towards an unmeshing position, viz; to a position wherein fin 66 is out of engagement with crown 67. In this position, core 65 will prevent the displacement of electromagnet i upon said core engaging a notch 71.

This engagement serves through electromagnet i, tubular shaft 63 and pinion 62, as a holding means for retaining auxiliary wheel d, in the inoperative position, due to pinion 62 holding gear 61 which is integral with disc 56.

Coil 64 of electromagnet i carries on the respective terminals thereof two brushes 72 and 73, engageable with annular contacts 74 and 75 on box 76 fixed to core 49. Said annular contacts are fed by leads 77 and 78 extending from switch h, Figs. 4, 11, and 34, having a lever 15 the end 15' of which is located, as explained above, in the path of stud 13 of device j when said stud assumes the position 13" (Fig. 2) upon a deflation of tire 4. The circuit of electromagnet i (Fig. 11) is closed by the pairs of contacts 24 and 26 when the end 15" of lever 15 is received by said contacts.

Thus, switch h is one of the switches of electromagnet i and upon a puncture and/or deflation of tire 4, said stem 6 will be displaced through the action of spring 12. On reaching the position 13", stud 13 will actuate lever 15 and close the circuit of electromagnet i, which will overcome the tension of spring 70 and attract core 65, placing fin 66 against crown 67 (see Fig. 14). Since said crown is attached to frame b' of the rotating wheel b, it will cause the rotation of electromagnet i therewith, together with tubular shaft 63, the pinion 62 of which will actuate gear 61. Gear 61 forming part of disc 56, the latter will be set in motion and displaced from the position shown in full lines in Fig. 12 to the position shown in dotted lines in the same Fig. 12. Disc 56 is provided with a tooth 79 which in reaching the upper position, from that shown in Fig. 12, will actuate switch j also interpolated in the circuit of electromagnet i, whereby said tooth 79 will interrupt the circuit of said electromagnet precisely at the time wheel d is in the operative position shown in dotted lines in Figs. 11 and 12, and inasmuch as spring 70 will move fin 66 out of engagement with crown 67 upon the circuit of electromagnet i being opened, the auxiliary wheel d will remain firmly in position, acting in place of the main wheel b.

As shown in Figs. 15, 16 and 17, switch j comprises a lever 80 the pivot 81 of which is provided with a lug 82 located within the path of tooth 79. Said lever 80 is provided with an intermediary contact 80' which when in the position shown in full lines in Fig. 15, connects the pair of contacts 83 included in the circuit of electromagnet i, whereas when in the dotted-line position, said lever 80 is engaged by clamping members 84 and 85, respectively. For the purpose of holding the circuit-closing position, said pivot 81 is provided with a prismatic head 81' engaged by leaf springs 86 and 87. Said leaf springs 86 and 87 complete the displacement initiated by lever 80.

The outer face of disc 56 is provided with a cap 88 which is concentric relative to core 49 and the cavity of which serves as a base for said gear 61.

The diameter of cap 88 is substantially larger than that of gear 61, thus leaving an annular space between them, in which is housed a shock-absorbing and braking device $k$. Said device $k$ does not bear against the body of cap 88 but is provided with brackets 89 and 90 indirectly mounted on core 49.

As shown in Fig. 12, said device $k$ comprises as a main member a bow spring 91, the ends of which are secured to the respective brackets 89 and 90. Said bow 91 is provided with a pair of resilient lugs 92 and 93 the ends of which face each other and are spaced so as to provide a gap 94 adapted to receive a tooth 95 on the outer face of gear 61.

Said lugs 92 and 93 are sufficiently resilient as to be overcome by the tooth 95 when the latter is displaced in either direction, but are also sufficiently strong to hold said tooth when it engages gap 94.

Bow 91 is provided with a pair of brake shoes 96 and 97, one of which, 96, is located between lug 92 and bracket 89, while the other shoe 97 is located between lug 93 and bracket 90.

When tooth 95 engages gap 94, it will still be affected by the inertia of the displacement thereof, and will act against the end of one of the lugs 92 or 93, deforming bow 91 until one of the shoes 96 or 97 contacts the inner face of cap 88, thereby causing a frictional braking effect. Due to the opposed tension of the two halves of bow 91, both lugs 92 and 93 will determine, in gap 94, the final position of tooth 95 and hence the operative position of auxiliary wheel $d$, shown in dotted lines in Figs. 11 and 12.

In the operative position of the auxiliary wheel $d$, it will replace the main wheel $b$, raising the latter from the ground as a result of the slight eccentricity of wheel $d$ relative to wheel $b$. The height at which wheel $b$ will remain with respect to the ground is indicated by the magnitude 98 in Fig. 10.

In Fig. 11, the operative position shown in dotted lines indicates the manner in which the main wheel $b$ remains in a raised position when the auxiliary wheel $d$ is rendered operative.

Cap 88 is provided with a shoulder 88' capable of being engaged by fin 82 of pivot 81 of switch $j$, and inasmuch as said tooth 79 is carried by said shoulder, the fin 82 will thus remain within the path of tooth 79.

Said cap 88 is also provided with a surrounding flange 88'' and as shown in Fig. 15, said box 76 is provided with a visor-shaped member 99 eccentrically circumscribed to the section of box 76, so as to form, together with edge 76' of said box 76, a flange 99' provided with a felt member 100 by means of which it is adapted against the flange 88'' of cap 88 (Fig. 11). A shielded housing is thus formed between box 76 and cap 88.

In order to have access within said housing, said member 99 is provided with a pair of openings 101 and 102 (Fig. 13) registering respectively with lugs 92 and 93, so that after the main wheel $b$ is removed for repair, the auxiliary wheel $d$ (after jacking up the corresponding end of the vehicle) may be returned to the inoperative position by freeing the tooth from one of the lugs 92 or 93, which may be done by means of a suitable tool.

Said visor-shaped member 99 serves as a base for bracket 16 of switches $g$ and $h$, and the outer face of said member 99 supports switch $j$, as may be seen in Fig. 11.

Figure 14:
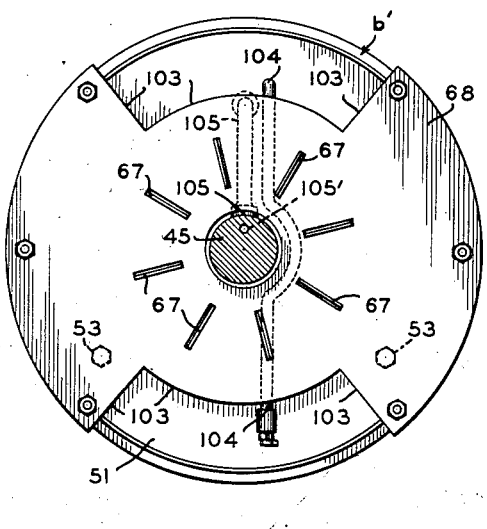
Fig. 14 is a sectional elevation taken along the lines 14—14 of Fig. 11.

Inasmuch as the auxiliary wheel $d$ covers the inner face of the main wheel $b$, as shown in Fig. 14, the frame supporting plate 68 is provided with openings 103 affording access to the drain tube 104 of brake cylinder 52 and eccentric nuts 53 of said brake system. A pipe 105 for hydraulic brake liquid passes through the auxiliary wheel $d$, extending through a longitudinal channel 105' on axle end 45 (Fig. 11).

Figure 18:
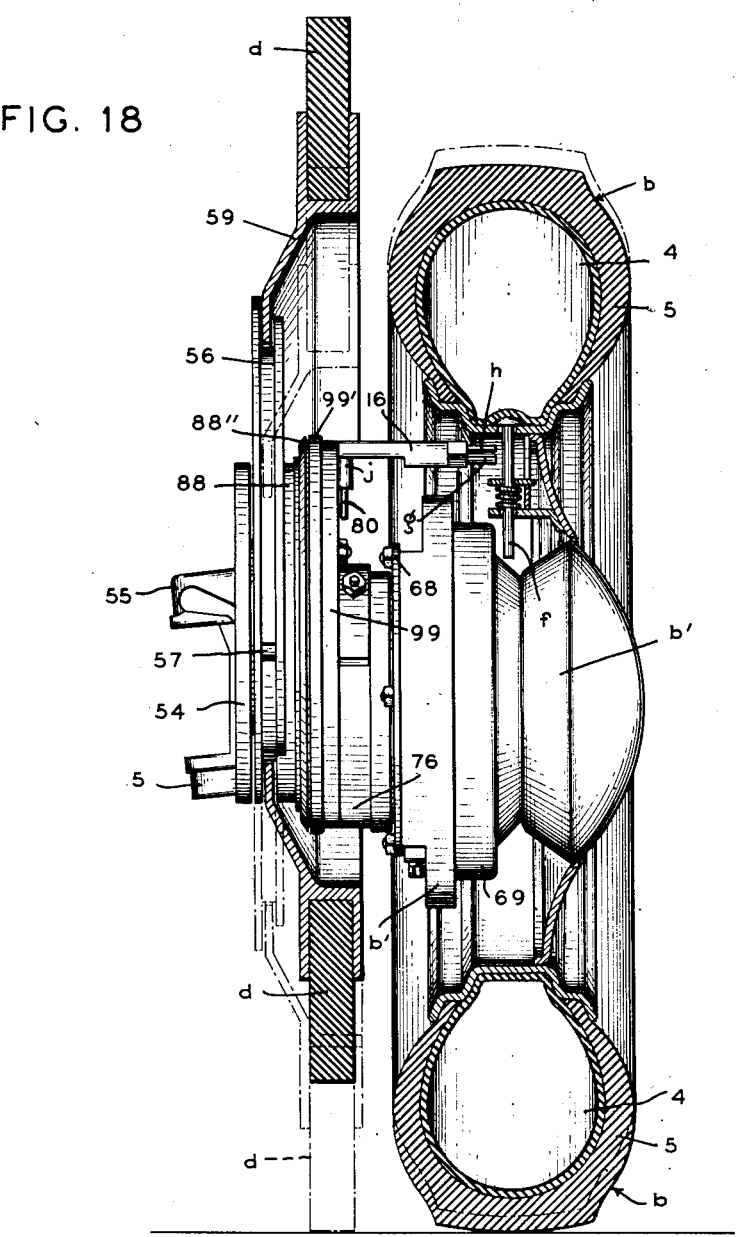
Fig. 18 is a partial and arbitrary sectional view of a further possible modification of the tread of the auxiliary wheels for the main road-wheels.

Fig. 18 is a schematic representation of the manner in which the tread of the auxiliary road-wheels $d$ may also be constituted by a disc holding a non-pneumatic tire. It is obvious, however, that the tread of the auxiliary wheels may have any desired construction.

Figure 19:
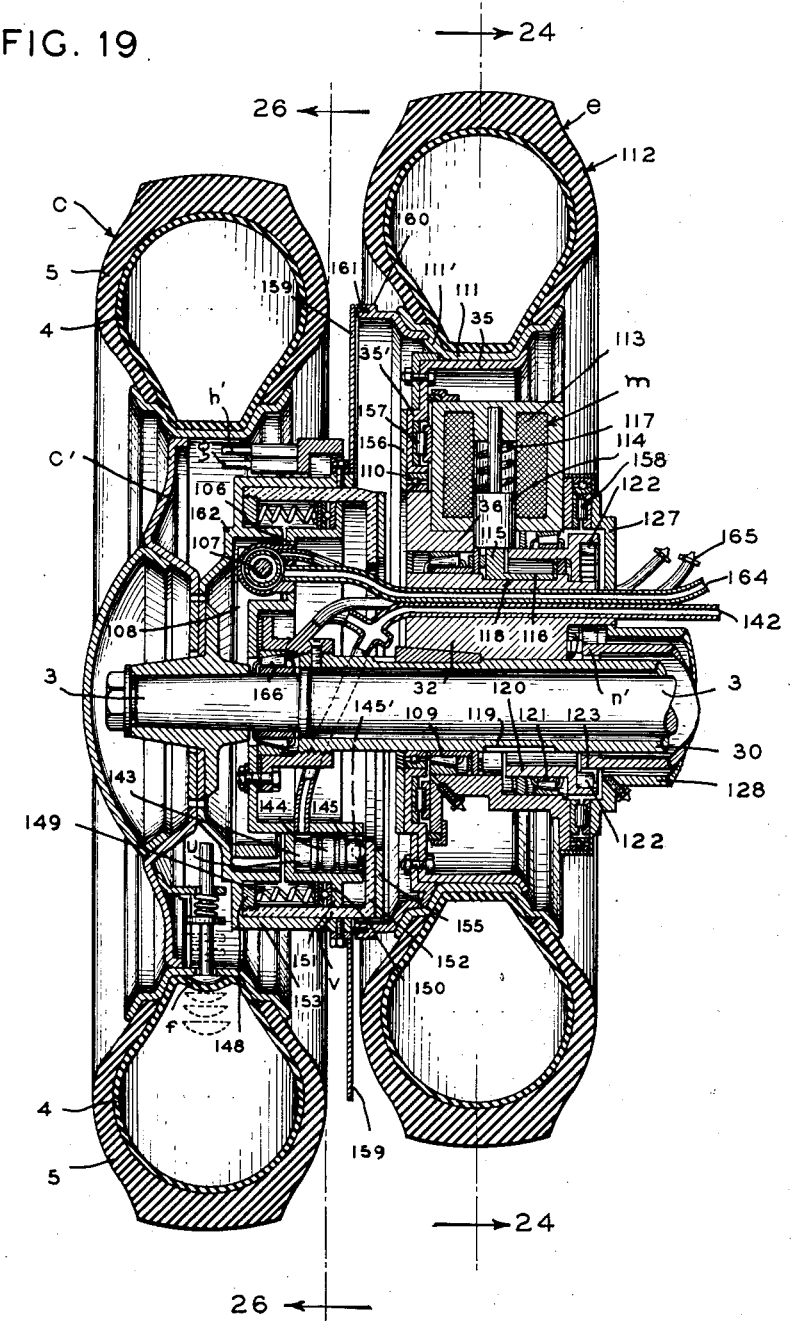
Fig. 19 is a vertical diammetrical section of the assembly of one of the main driving wheels and the corresponding auxiliary wheel, showing the manner in which the latter is mounted and also the means connecting same to the main wheel, the auxiliary wheel being shown in retracted or inoperative position.

In Fig. 19, illustrating the case of a driving wheel, it will be seen that the half-axle 3 extends from the corresponding differential 2, included in a sleeve 30, until it joints the frame $c'$ of the corresponding wheel $c$, while sleeve 30 is attached to the fixed plate 106 where the brake, constituted by hydraulic cylinder 107 and shoes 108, is mounted.

Inasmuch as the auxiliary wheel $e$ is mounted as indicated in Fig. 7, it is provided with a mounting core 32 which is eccentric relative to half-axle 3 and so fixed to sleeve 30 that the latter remains within the area of core 32 with which it is internally tangential.

Said core 32 is provided with a set of rollers 109 by means of which said body 36 is eccentrically adapted, said body 36 acting by means of balls or rollers 110 as a shaft for the rotation of wheel $e$ constituted by a frame 35 carrying a rim 111 to which the tire 112 is adapted.

Figure 24:
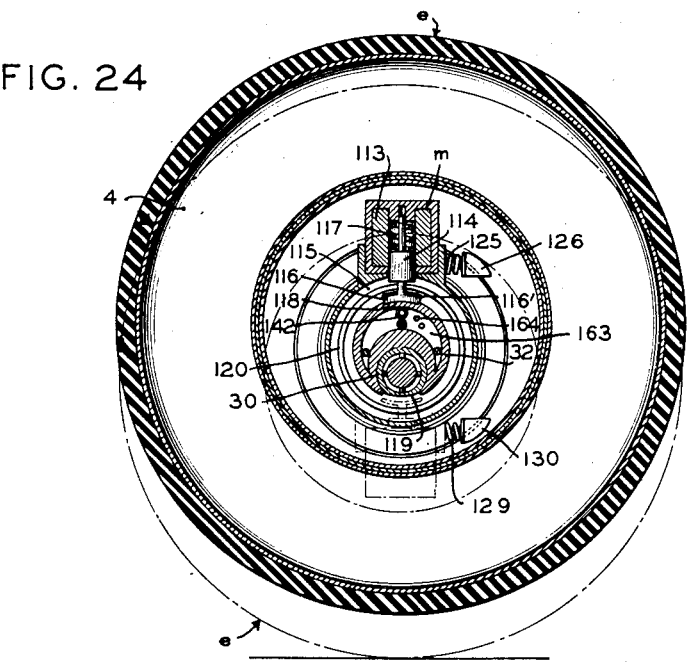
Fig. 24 shows a section of the auxiliary driving wheel, taken along the lines 24—24 of Fig. 19.

Said body 36 is provided with an electromagnet $m$ the coil 113 of which has an axial perforation wherein is housed a movable core 114 having a stem-like extension 115 terminating in a shoe 116. Said core 114 is urged towards the center of core 32 by means of a spring 117, and as shown in Figs. 19 and 24, when wheel $e$ is in inoperative position, said shoe 116 engages a notch 118 on core 32, while in the operative position of the auxiliary wheel $e$, shown in Fig. 21, and in dotted lines in Fig. 24, said shoe engages a notch 119 located at 180° from notch 118 on said core 32.

Concentrically located around core 32 is a cylinder 120 which is mounted in a bore in body 36 by means of rollers 121, as shown in Figs. 19 and 22, allowing cylinder 120 to rotate independently of body 36. However, said cylinder will act as an indirect means for driving body 36, as upon said cylinder being rotated, shoe 116 will act as intermediary means on being connected through attraction of electromagnet $m$, in the circuit.

For this purpose, shoe 116 is provided with an extension disposed angularly with respect to stem 115 and having a contact surface 116' facing the inner surface of said cylinder 120.

Cylinder 120 is provided with a gear having inner teeth 122 meshing with a pinion 123 located at the end of a tubular shaft $n$. Said shaft $n$ corresponds to the right-hand side of the vehicle, as the left-hand side tubular shaft is indicated by $n'$. Said shafts $n$ and $n'$ surround the corresponding sleeve 30, each shaft terminating near the differential 2 in a gear 124, Fig. 6.

For the purpose of defining the two positions, viz; the operative and inoperative positions of wheel e, an upper spring stop 125 (Fig. 24) bears on bracket 126 fixed to plate 127, which is in turn fixed to a dust seal 128 enclosing the tubular shaft n or n' and sleeve 30 with the corresponding half-axle 3, while a lower spring stop 129 is mounted on bracket 130 which is also fixed to plate 127. Said springs 125 and 129 limit the displacement of body 36.

Figure 6:
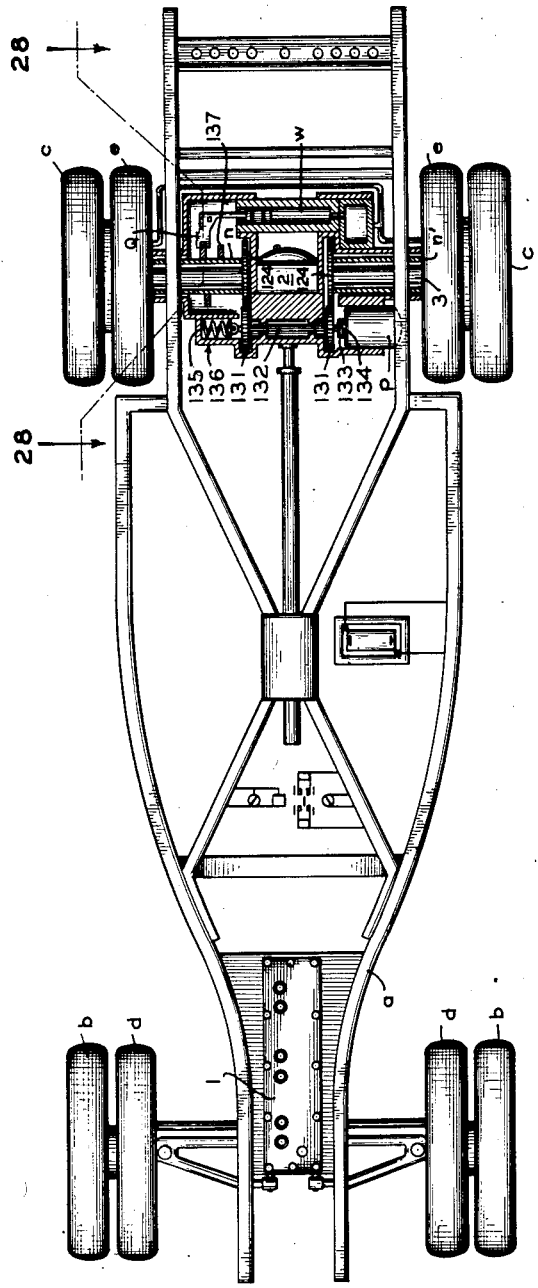
Fig. 6 is a plan view of an automobile chassis provided with the emergency equipment, said chassis being slightly modified so as to receive the auxiliary wheels.

As shown in Fig. 6, said gears 124 mesh with respective pinions 131 on shaft 132 coupled to motor p by means of plates 133 and 134, said plates being engaged by the pressure of spring 135 bearing on box 136 and acting against the end of said shaft 132. The tension of spring 135 should be sufficient to hold plates 133 and 134 engaged, for the purpose of transmitting the motion of the motor to the tubular shafts n and n'. However, said plates should not be interlocked, so that should the resistance of the driven part exceed a predetermined value, said engagement will be interrupted, thereby cancelling the drive. Motor p is of the reversible type, inasmuch as it must act both in rendering wheels e operative and inoperative.

The circuit of motor p is closed through the actuation of switch h' responsive to the automatic device f which, as already stated, will function on being displaced due to a deflation of tire 4.

Figure 34:
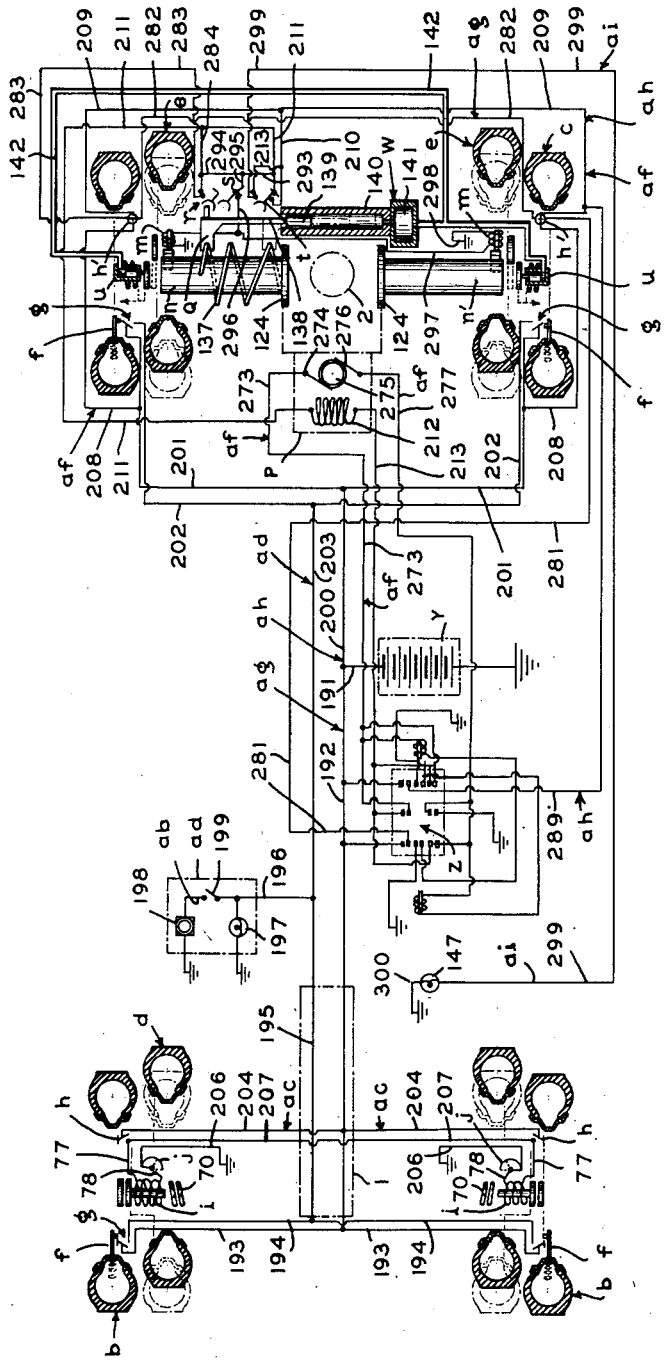
Fig. 34 is a general diagram of the electrical circuits for setting in operation and retracting the auxiliary road-wheels and driving wheels, which are shown in full lines in inoperative position, and in dotted lines in operative position. The circuits have also been combined with some schematic mechanical details.

Said tubular shaft n is screw-threaded at 137, the pitch of said screw-thread being progressively graduated, as shown in Fig. 34. The purpose of this spiral is to convert the circular motion into a longitudinal motion, slow or retarded in a first step and fast or accelerated in a second step. This longitudinal movement is parallel to the driving half-axles 3.

A slider q is coupled to said screw-thread 137, and this slider effects a rectilinear movement due to the pitch of said screw-threads.

Slider q carries attached thereto a rod 138 the end of which terminates in a piston 139 acting in a cylinder 140. Said cylinder and piston constitute a pump w supplemented with an expansion chamber 141. Said expansion chamber stores a quantity of air which during the compression affords elasticity and tension to the system responsive to the pump, which is hydraulic inasmuch as it acts with oil or other suitable liquid.

A pipe 142 is connected to the outlet of chamber 141, said pipe being branched and the branches leading to the respective wheels c.

At the wheels c, said pipes 142 are coupled (Fig. 19) to the cylinders 143 of driving devices u mounted on said fixed plate 106 and equidistant with respect to half-axle 3. Said cylinders 143 are provided with pistons 144 each stem 145 of which terminate in a ball 145'.

Said slider q is provided with a stud or stem 146 capable of engaging the arcs of sequence reversible switches r, s and t. Switch r corresponds to the hand controlled circuit for retracting the auxiliary wheels e; switch s is the interruptor of the circuit of electromagnets m, while switch t is one of the switches inserted in the circuit of motor p as regards the automatic operation (device f) and also one of the switches of the circuit of said motor p corresponding to the operation at will of wheels e; said switch t is also provided with contact means corresponding to the circuit of indicator lamp 147, said switches r, s and t are disposed in a special enclosure constituting a box of reversible sequence switches.

A sufficiently important fall in fluid pressure having occurred in the tire corresponding to one of the driving wheels c, the corresponding automatic device f thereof will actuate the switch h' which closes the circuit of motor p and also closes the circuit of electromagnets m, thereby pulling the respective cores 114 and connecting the corresponding shoes 116 against the inner face of cylinder 120, whereby the corresponding bodies 36 will be coupled to cylinders 120 which, through the action of motor p and the respective gears, are responsive to the rotation of tubular shafts n and n'. Thus, due to the action of said gears and pinion 123 acting on gear 122, the cylinder 120 of each wheel, connected by shoe 116, will cause the displacement of body 36 acting as an axle for wheel e and placing the latter in the operative position shown in Fig. 21, wherein it is concentric with the main wheel c.

This displacement is effected with a corresponding delay, imposed by the reduction obtained through the number of teeth on drive pinion 131 relative to gears 124, and the number of teeth on pinion 123 with respect to gear 122.

Figure 20:
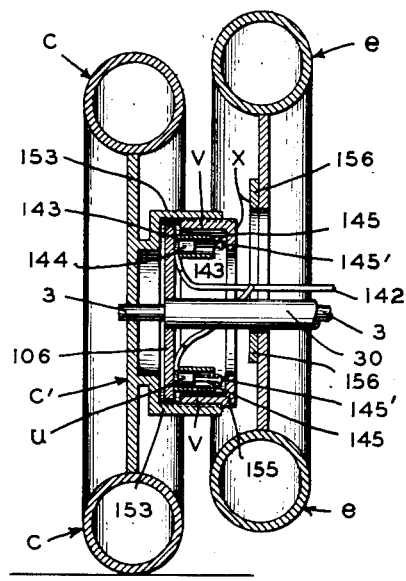
Fig. 20 is a schematic representation of one of the driving wheels, with the respective auxiliary wheel in inoperative position.
Figure 21:
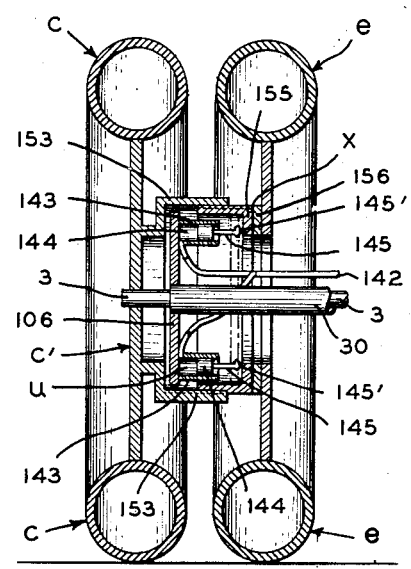
Fig. 21 is a schematic representation of one of the driving wheels, with the corresponding auxiliary wheel in operative position.

Said shift of wheels e from the inoperative position (Figs. 19 and 20) to the operative position shown in Fig. 21 will take place from the position shown in full lines in Fig. 24 to the position shown in dotted lines in said Fig. 24, or at 180° when shoe 116 registers with notch 119, since upon tubular shafts n and n' being rotated, the screw-threads 137 of shaft n will move slider q, the stop 146 of which will operate reversible switch s, thereby breaking the circuits of electromagnets m; this will occur after the operation of reversible switch r which will leave the connection established so as to prepare the circuit for the retraction of wheels e which are responsive to hand actuation of a commutator switch z. Inasmuch as at the end of the stroke of slider q, said stop 146 will actuate reversible switch t, the circuit of motor p will be opened, stopping the mechanical movement described.

At the same time, the slower initial portion of the stroke of slider q will actuate piston 139 in pump w, thereby preparing the hydraulic system, i. e., propelling the liquid in pump w and the lines thereof, at which time the air in chamber 141 will be compressed so as to give resiliency to the system. During the second portion of the stroke of slider q, liquid is driven from pump w to cylinders 143 of devices u through lines 142.

Around plate 106 is a clutch drum v (Fig. 19) provided with an inner flange 148 by means of which said drum is pressed by spring 149; by means of a bearing 150, said spring 149 bears freely against the outer flange 151 of fixed plate 106. Said drum v is also provided with a further inner flange 152, wider than flange 148 and registering with the balls 145' on stems 145 of said devices u.

Figure 26:
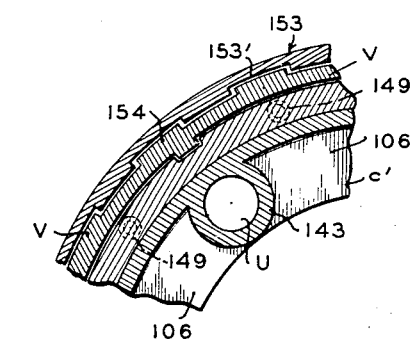
Fig. 26 is a partial schematic view corresponding to the mounting of the clutch between the main driving wheel and the corresponding auxiliary wheel, taken along lines 26—26 in Fig. 19.

When the pressure of the oil entering cylinder 143 drives piston 144, with stem 145 and balls 145' thereof, it will drive said clutch drum v, as said balls will act on flange 152 on said drum. Drum v is telescoped into a second drum 153 which is associated with the brake drum and fixed thereto, forming part of the rotary body or frame c' of wheel c. As shown in Fig. 26, said drum 153 is provided with grooves 153' adapted to receive ridges 154 on drum v, so that said drum will be responsive to the rotary action of the second drum 153 corresponding to frame or body c' of wheel c, while the location of said ridges 154 in grooves 153' will permit the free longitudinal sliding movement parallel to the half-axle 3. Thus, when pump w drives liquid through lines 142, said liquid will reach cylinders 143 of devices u of the respective wheels c and operate pistons 144, thereby displacing drum v, through stem 145, towards auxiliary wheel e so as to connect same to the main wheel c, for which purpose drum v is provided with a coupling ring 155 forming, together with ring 156, the clutch indicated at x. Said ring 156 is attached to the outer face of band 35' of piece 35 corresponding to the rotary portion of wheel e (Figs. 19, 20 and 21). Inasmuch as the secondary or auxiliary wheel e is carried to the operative position through the action of motor p in its first step, and the action of the passage of oil to said devices u takes place on the second step of the action of screw-threads 137, once the displacement of clutch drum v is completed, said auxiliary wheel e will be in the operative position shown in Fig. 21, whereby ring 156 will be concentric with ring 155 so as to establish the connection or clutching action, thus making auxiliary wheel e responsive to the action of the main wheel c.

The clutch will set up a component in the direction of differential 2, and thus said band 35' of part 35 will bear against body 36 by means of bearing member 157, and said body 36 will in turn bear against the fixed plate 127 by means of the bearing member 158 (Fig. 19).

As stated hereinbefore, said plate 127 is fixed to dust seal 128, the right-hand side of which incloses the tubular shaft n, while the left-hand side thereof includes said tubular shaft n'. Jacket 30 and half-axles 3 are also included in both sides.

The second drum 153 of frame c' has attached thereto a shielding plate 159 against which is adapted a cap 160 fixed to the rolling member 35 and engaging rim 111 by means of teeth 111'. A felt member 161 seals said cap 160 to said plate 159.

Said shielding plate 159 forms, together with cap 160, a closed housing protecting clutch x and the associated parts thereof. Plate 159 is concentrical relative to the main wheel c, and since in the inoperative position shown in Figs. 19 and 20 the supplementary wheel e will be eccentrically disposed relative to the main wheel c, said plate 159 has a radius sufficiently large to engage cap 160 in any of the positions assumed by the auxiliary wheel e.

Switches h' and g are shown in Fig. 19 outside of the drum assembly of frame c' only for the purpose of facilitating the understanding of the mechanism, but in practice said switches will be located within the brake drum 162 on bracket 17, which is in turn secured to fixed plate 166 and the flange of jacket 30, as shown in Fig. 23. For this purpose, stem 6 extends guided towards half-axle 3 through frame c' and has stud 13 within said frame, so that during the stroke thereof it will register with arms 14 and 15 of said switches g and h'.

The conductors of the circuits in which said switches g and h' are interpolated, extend thereto through an opening 163 in core 32, as shown in Figs. 19 and 24.

Feed conductors 142 of driving devices u, conductors 164 of the brake system the elements of which are indicated at 107 and 108, and lubricating lines 165 corresponding to the lubrication of bearings 166 of half-axle 3, extend through said opening 163.

While wheels e are in operative position, Fig. 21 and dotted lines in Fig. 24, slider q will assume the position shown in dotted lines in Fig. 34 and in full lines in Fig. 27, and therefore reversible sequence switches r, s and t will be in the position shown in full lines in Fig. 27.

As already stated, the retraction of wheels e is effected by actuating commutating switch z at the will of the driver, thereby re-closing the circuit of motor p but in the opposite functional direction.

With this action of motor p, said tubular shafts n and n' are rotated by means of pinions 131 meshing with gears 124 (Fig. 6). By means of pinions 123 meshing with gears 122, said tubular shafts n and n' will rotate said cylinders 120, while at the same time the screw-threads 137 on shaft n will cause the displacement of slider q from the position shown in dotted lines to that shown in full lines in Fig. 34, and from the full-line position to the dotted-line position in Fig. 27. This movement of the slider will cause the return of piston 139 from the position shown in dotted lines to that shown in full lines, thereby so reducing the pressure in devices u, that the tension of springs 149 will prevail and withdraw drum v towards the position shown in dotted lines in Fig. 21, thereby unclutching the auxiliary wheels e. On the other hand, the same displacement of slider q will shift the position of reversible sequence switches t, s and r, to that shown in dotted lines in Fig. 27 and in full lines in Fig. 34.

By means of blade 167, switch t prepares the circuit of motor p so that it may be duly closed, either by means of switch h' or commutator z.

Switch s will close the circuit of electromagnets m so that by pulling core 114, it will bring shoe 116 out of engagement with notch 119 and connect same with the inner surface of cylinder 120 which rotates in the opposite direction through the action of motor p, as already mentioned, and therefore operates as a driving cylinder, causing the movement of electromagnets m together with body 36, from the position shown in dotted lines to that shown in full lines in Fig. 24, so that said body 36 will shift by 180°. As body 36 acts as a shaft for wheel e, it will raise the latter to the inoperative or eccentric position, Figs. 19 and 20. At the time wheels e reach the inoperative position, the change in position of switch r interrupting the motor p and electromagnets m will take place, and thereby the operation will stop instantly, with only wheels c depending on engine 1.

Switch t is provided with two intermediary contact blades, a long one indicated at 167 and acting in the circuit of motor p and of electromagnets m, and a shorter blade 168 acting in the circuit of indicator lamp 147. Blade 167, being long, will break the circuit of electric motor p (Fig. 27), only at the end of its displacement, when slider q has completed its stroke from the position shown in Fig. 34 to the position indicated in dotted lines at the opposite end of screw-threads 137 in the same figure, and which in Fig. 27 is from the full-line position to that shown in dotted lines.

Tubular shaft n with the screw-threads 137 thereof and slider q are enclosed in the dust seal 128, Fig. 28, which apart from serving as a protective casing, is provided with guides 169 and 170 for the sliding movement of slider q. The first guide 169 is constituted by a slot through which stud 146 is extended towards box 171 the walls of which are provided with bearings 172 and 172' in which are mounted the shafts 173, 174 and 175 of switches r, s and t, respectively.

The shafts of reversible sequence switches r, s and t extend outwardly from box 171 through bearing 172' where they are attached to the respective arms 176, 177 and 178 which, as shown in Fig. 28, act within box 179 having the contacts of the different circuits and therefore being independent of box 171, as the latter is lubricated, as is also the mechanism enclosed by dust seal 128.

Said shafts 173, 174 and 175 are provided with prismatic portions against which are adapted leaf springs 180 and 181 which may form a biarcuate pair as shown in Fig. 31, or said leafs may act against a single phase as in the example of Fig. 28.

Reversible sequence switches r, s and t are in the nature of double power arm levers and are anchor-shaped; as such, the power portion is provided with a bow the free ends of which form the two power arms.

Said bows are indicated at 182, 183 and 184 respectively. Inasmuch as they are attached to the shaft at the midportion thereof, they provide two power arms so that the switches will operate as actual levers, wherein the resistance is constituted by the end of arms 176, 177 and 178.

Stud 146 of slider q will act between the arms provided by bows 182, 183 and 184, and therefore when the slider is displaced in one direction it will act on one of the arms of each switch, and when it is displaced in the opposite direction, said stud 146 will act on the other arm of each switch.

Switch r is provided with a blade 185 acting as intermediary between the pair of contacts 186 constituted by contacts 186' and 186'' corresponding to the circuit of motor p for the retracting of the auxiliary wheels e, said circuit being linked with the circuit of electromagnets m, the main interrupter of which is constituted by switch s. Switch r has the corresponding circuit thereof closed when slider q is in the position shown in dotted lines in Fig. 34 and in full lines in Fig. 27.

Arm 177 of switch s is provided with a blade 187 acting as intermediary between the pair of contacts 188 constituted by contacts 188' and 188''. Said pair of contacts 188 together with blade 187, form the interrupter of the circuit of electromagnets m, as already stated, said circuit being linked with the conductors of the circuit interrupting switch r and of one of the circuits interrupting switch t, whereby the circuit of electromagnets m will be responsive not only to the position of switch s but also of switches r and t.

Switch s joins contacts 188' and 188'' when slider q is in the position shown in full lines in Fig. 34 and in dotted lines indicated at q'' or q' in Fig. 27.

Arm 178 of switch t is provided with two blades 167 and 168, of which blade 167 is in the form of an extended arc, so as to operate as an intermediary between the pair of contacts 189 constituted by contacts 189' and 189'' interpolated in the circuit of motor p connected thereto for the operation of auxiliary wheel e, and the same conductor breaking contacts 189' and 189'' is linked in the circuit of electromagnets m, so that said circuits will be closed when prepared by the insertion of blade 167.

Blade 168 which is shorter than blade 167 will act between the pair of contacts 190 constituted by contacts 190' and 190'' interpolated in the circuit of indicator lamp 147, the lighting up of which will indicate that auxiliary wheels e are operating.

The closure of contacts 189' and 189'' is effected when slider q is in the position shown in full lines in Fig. 34 and in dotted lines in Fig. 27, and the closure of contacts 190' and 190'' is effected when slider q is in the position shown in dotted lines in Fig. 34 and in full lines in Fig. 27.

The three reversible sequence switches r, s and t are aligned, so that the reversal will take place during the stroke of slider q, but inasmuch as said stroke is related with the time taken by the setting in operation and clutching movements of wheel e with respect to the main wheels c, switches r and s are closely spaced, so that the respective anchors thereof overlap. However, in order to avoid interference between them, one of said switches, r or s has the anchor thereof located in a plane different to that of the other switch.

In case of emergency by deflation of one of the tires 5 of the main wheels b or c, the corresponding device f will operate, moving to the positions shown in dotted lines in Figs. 2, 11, 19 and 34, wherein stud 13, in reaching the position 13' (Fig. 2) will actuate lever 14 of switch g.

Upon lever 14 assuming the position 14''' or 14'''' said switch g, Fig. 3, will close the alarm circuit of the roadwheels or driving wheels, as the case may be. Said alarm circuit comprises the following parts: A source of electric power constituted by a battery y, Figs. 6 and 34, a conductor 192 extending from the live pole of said battery to said road-wheels b. Conductor 192 is divided into two branches indicated at 193, leading to the respective switches g of road-wheels b, i. e. to contacts 19' and 21' forming part of the pairs of contacts 19 and 21, respectively. Conductors 194 joined with conductor 195 leading to the alarm system aa through conductor 196, are derived from further contacts 19'' and 21''. The alarm system comprises an indicator lamp 197 which is grounded, and a sound device 198, such as a buzzer or the like, which is also grounded.

Once the driver has been warned of the pneumatic failure, he is able to cut off the action of sound device 198 by actuating switch 199.

Inasmuch as switch 199 is inserted in the section of the circuit corresponding to the sound device only, even after switching off by means of switch 199, said lamp 197 will remain excited, whereby the failure cannot be overlooked. Lamp 197 will only be extinguished when the corresponding lever of switch g has been returned to the normal position shown in full lines in Fig. 3.

Similarly, from the live pole 191 (Fig. 34) is derived a conductor 200 extending to the driving wheels c, dividing into two branches 201 leading to the respective switches g, Fig. 3.

Switches g corresponding to road-wheels b are similar to switches g corresponding to the driving wheels c, and therefore conductors 201 are connected to contacts 19' and 21' of contact pairs 19 and 21, Fig. 3; conductors 202 joined together so as to form a conductor 203 leading to the alarm system aa through said conductor 196, are derived from contacts 19'' and 21''.

If the deflation occurs in one of the main roadwheels b and the loss of pressure continues, said stud 13, upon passing to the position 13'', Fig. 2, will actuate lever 15 of switch h.

The operative electric circuit of the auxiliary road-wheels is as follows (Figs. 11 and 34). Electric power from battery $y$, Fig. 34, flows through conductor 192 branched into conductors 204 extending to the respective set of wheels.

Thus, conductor 204 reaches the inner face of fixed plate 54, passing through the latter, through core 49 and the visor-shaped member 99, by means of a perforation 205. Thus, conductor 204 extends to switch $h$, Fig. 4, where it is connected to contacts 24' and 26' of contact pairs 24 and 26, and as return connection, conductor 77 is derived from contacts 24" and 26" of the same contact pairs 24 and 26, said conductor 77 extending to contact 74 with which is associated a brush 72 corresponding to one end of winding 64 of electromagnet $i$, the other end of which is provided with a brush 73 associated with the annular contact 75. A conductor 78 extends from contact 75 to contact 83' of contact pair 83 corresponding to switch $j$, while conductor 206, which is grounded, extends from contact 83" of the same pair.

As may be seen in Fig. 34, conductor 77 is connected through conductor 207 to conductor 77 of the wheel located at the opposite side, so that the closure of the circuit for one wheel will have the same functional response on the opposite wheel.

As already stated, the live pole 191 of battery $y$ has connected thereto said conductor 200 which by means of conductors 201 is branched, leading to both main wheels $c$.

Said conductors 201 have connected thereto conductors 208 extending to switch $h'$.

Figure 5:
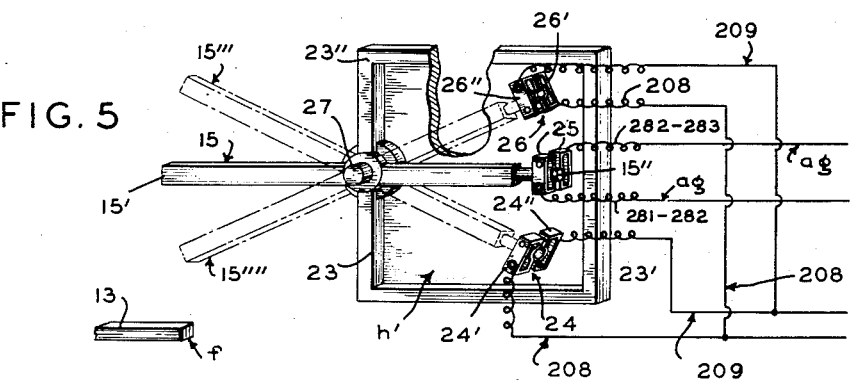
Fig. 5 shows one of the two switches responsive to the action of the automatic device shown in Fig. 2, corresponding to the automatic operation of the auxiliary driving wheels and associated with the hand controlled retracting circuit.

On entering switches $h'$, as shown in Fig. 5, said conductors 208 are branched so that each branch will be connected to a different contact. Thus, one of the branches is connected to contact 24' of the pair of contacts 24, while the other branch is connected to contact 26' of pair 26.

Conductors 209 are derived from contacts 24" and 26" of the same pairs 24 and 26, said conductors 209 being joined to conductor 210 extending to contact 189' of pair 189 of switch $t$, Figs. 27 and 34. As mentioned above, the pairs of contacts 189' and 189" are joined by the interposition of blade 167 when switch $t$ assumes the position shown in full lines in Fig. 34 and in dotted lines in Fig. 27. A conductor 211 derives from contact 189" of pair 189 and extends to inductor coil 212 of electric motor $p$. From coil 212 is derived a conductor 213 leading to commutator switch $z$ (Figs. 30, 31, 32, 33 and 34).

Commutator switch $z$, shown in detail in Figs. 30, 31, 32 and 33 is the control device actuated at will by the driver, in order to render operative the auxiliary driving equipment. Fig. 31 is a plan view wherein the reference numeral 214 indicates the basic bow of the armature of switch $z$; above bow 214 is a further bow 215 having a larger radius. The mounting of bows 214 and 215 is clearly shown in Fig. 30, which is a sectional view along the lines 30—30 of Fig. 31, and in Fig. 32 which is a sectional view taken along the lines 32—32 of Fig. 30.

The curved surface of bow 214 is cut away, forming three gaps 216, 217 and 218, of which gap 217 is not shown in the plan view of Fig. 31 as it is covered by bow 215.

Each of said gaps is limited by two arcuate members forming part of bow 214. Gap 216 is laterally limited between members 219 and 220; gap 218 is laterally limited between members 221 and 222, and the intermediary gap 217 is limited between members 220 and 221, inasmuch as this gap is adjacent to gaps 216 and 218.

The ends of arcuate members 219, 220, 221 and 222 are attached to members 223 and 224, and these are in turn attached to members 225 and 226 converging at the hub of shaft 227 where movable member $zc$ is mounted, as shown in Fig. 31.

Bow 215 is supported from the same general frame completed by members 225 and 226.

Figure 33:
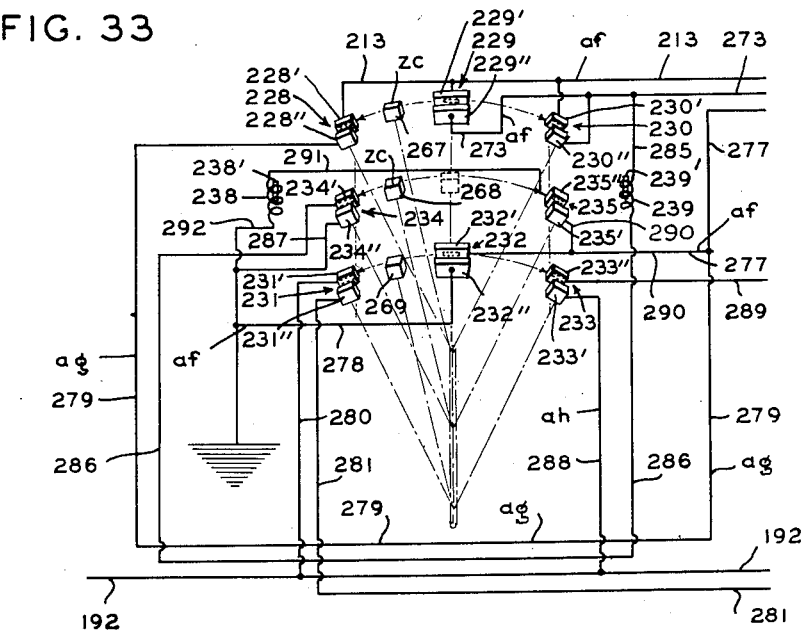
Fig. 33 is a schematic perspective view of the hand actuated commutator switch contacts, shown in Figs. 30, 31 and 32.

Gap 216 presents three pairs of electric contacts 228, 229 and 230. Gap 218 is also provided with three pairs of electric contacts 231, 232 and 233, while the central gap 217 only has two pairs of contacts 234 and 235. The pairs of contacts 228, 234 and 231 of the respective gaps 216, 217 and 218 are located in the neighbourhood of member 223, aligned as shown in Figs. 31 and 33.

Contacts 230, 235 and 233 of the same gaps are located near member 224, and these contacts are also aligned.

The pairs of contacts 229 and 232 of gaps 216 and 218, are on the mid-line of the assembly.

Figure 30:
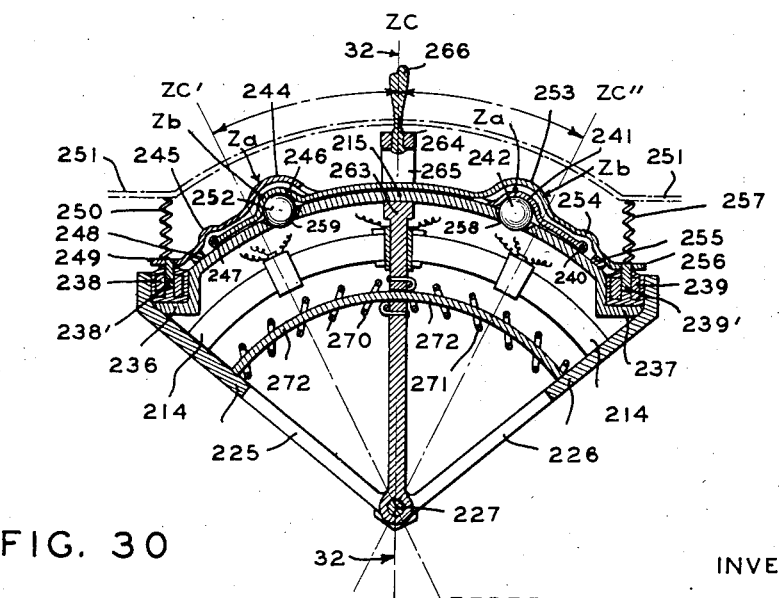
Fig. 30 is a sectional view of the same hand actuated commutator switch, taken along line 30—30 of Fig. 31.

At the ends of the bow corresponding to sector 215 are sockets 236 and 237 housing electromagnets 238 and 239. Adapted over bow 215, Figs. 30 and 31, are arcuate levers $za$ and $zb$. Lever $za$ is hinged to bow 215 by means of hinge 240, Figs. 30 and 31, and from said hinge the lever $za$ extends along bow 215 to the remote end of same.

At a slight distance from hinge 240, said lever $za$ has a dome 241 engaging a ball 242. Said lever $za$ is divided into two branches leaving a space 243 therebetween, to allow the passage of lever $zb$. By means of bridge portions 244 and 245, said lever $za$ extends over dome 246 and hinge 247 of lever $zb$, and finally lever $za$ bears on gasket 248 and terminates in an extension 249 having attached thereto the core 238' of electromagnet 238. The end of lever $za$ is slightly pressed by spring 250, Fig. 30, tending to hold core 238' within the axial socket of electromagnet 238. Said spring 250 bears against panel 251 to which it is attached.

The other lever $zb$ is mounted on bow 215 by means of hinge 247, extending therefrom, to the opposite end of bow 215, in the same manner as lever $za$ but in the opposite direction, passing through space 243 provided by lever $za$. Near hinge 247, said lever $zb$ has a dome 246 adapted over ball 252, and from said dome 246 lever $zb$, extending between both branches of lever $za$, passes over dome 241 and hinge 240 of lever $za$ by means of bridge portions 253 and 254. Finally, lever $zb$ bears on gasket 255 and terminates in an extension 256 having attached thereto the core 239' of electromagnet 239 (Fig. 30). The end of lever $zb$ is slightly pressed by a spring 257 (Fig. 30) which in order to avoid rattling, tends to hold core 239' within the axial socket of electromagnet 239. Said spring 257 bears on panel 251.

Balls 242 and 252 are engaged in perforations 258 and 259, respectively, said perforations being sufficiently large so that said balls will project from the underside of bow 215, by an amount capable of constituting a stop for the control member $zc$.

Figure 32:
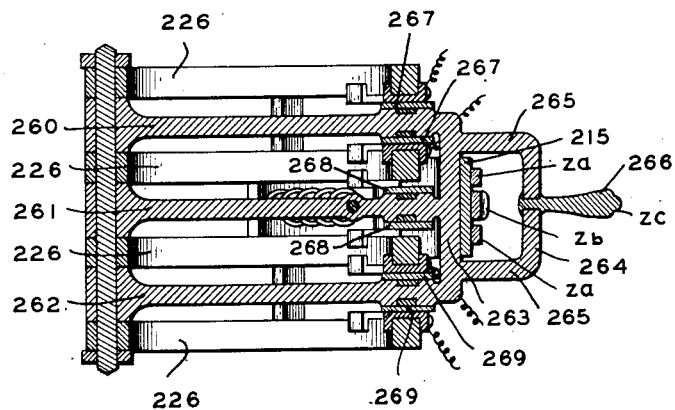
Fig. 32 is a further sectional view of the hand actuated commutator switch, taken along line 32—32 of Figs. 30 and 31.

Control or commutator member $zc$, as already stated, is journalled on shaft 227, Figs. 30 and 32, having three branches 260, 261 and 262 supplemented by a member 263 secured to bridge member 264 by means of side members 265, Fig. 32, and as shown, said bridge member is provided with a handle 266 for actuating said commutator member zc. Members 263, 264 and 265 serve as a frame within which is adapted bow 215 so that said member 263 will remain flush with the under-face of said bow.

Said commutator member zc of commutator switch z comprises three knives or blades 267, 268 and 269, Figs 32 and 33, arranged in an insulated manner on the respective branches 260, 261 and 262, and intended to connect the contacts of each pair on switch z during the angular movement of commutator member zc, which is capable of being displaced from the normal intermediate position shown in full lines in Fig. 30, to the position indicated at zc' or zc''.

The normal intermediate position of commutator member zc is defined by opposing springs 270 and 271 acting antagonistically against said member zc upon bearing against members 225 and 226. Said springs 270 and 271 are guided on an arcuate rod 272 (Fig. 30).

Inasmuch as balls 242 and 252 project beyond the under-face of bow 215, upon manually displacing said movable member zc towards the positions zc' or zc'', lever za or zb will be operated.

As member 263 of actuating member zc will strike and displace ball 242 or 252, (depending on the direction of said displacement), and as each of said balls is adapted in the dome of the respective lever, on being displaced by member 263 the corresponding ball will act as a power transmission to said levers za or zb. After moving beyond ball 242 or 252, said actuating member zc will close the circuit of electromagnet 238 or 239 thereby holding lever za or zb. Ball 242 or 252 will then hold said member 263 due to the fact that the corresponding lever za or zb will keep the corresponding ball projecting through orifice 258 or 259, thereby acting as a limiting stop for member 263.

Thus, for example, if commutator member zc is brought to the position zc', member 263 thereof will strike ball 252, raising same without any difficulty due to the fact that lever zb is yieldable, and thus member zc will move beyond ball 252 and reach positions zc'' where the knives or blades 267, 268 and 269 thereof will connect the respective pairs of contacts 228, 234 and 231, Fig. 33. As one of said contacts corresponds to the circuit of electromagnet 239, upon said circuit being closed, said electromagnet 239 will attract core 239' so that lever zb will so ensure the position of ball 252 that the latter will constitute a stop holding member zc in the position zc', regardless of the tension of opposing springs 270 and 271. This position of member zc is held until the circuit of electromagnet 239 is interrupted. In such case, once the attraction of electromagnet 239 ceases, lever zb will remain weakly seated, so that springs 270 and 271 will easily overcome said ball 252 and cause the return of member zc to the normal or intermediate position thereof, shown in full lines in Figs. 30 and 31.

If commutator member zc is displaced to the position zc'', ball 242 will act as a stop when lever za is held by electromagnet 238, as member zc will connect the pairs of contacts 230, 235 and 233, Fig. 33, by means of knives or blades 267, 268 and 269, respectively, one of said contact pairs being responsive to the circuit of electromagnet 238. The stop action, in the case of position zc'' is the same as that for position zc'.

In commutating switch z, conductor 213 is connected on the one hand to contact 228' of the pair of contacts 228, Fig. 33. On the other hand, it is connected to contact 229' of the pair of contacts 229, and similarly conductor 213 is connected to contact 230' of the pair of contacts 230.

As shown in Fig. 33, from each of the contacts 229'' and 230'' of contact pairs 229 and 230, is derived a branch corresponding to conductor 273 leading to terminal 274 of rotor 275 of motor p. From the opposite terminal 276 of said rotor, a conductor 277 extends to commutating switch z where it is connected on the one hand to contact 232' of the pair of contacts 232, a conductor 278 extending to ground from the other contact 232'' of said pair; on the other hand, conductor 277 is joined to conductor 279 extending to contact 228'' of the contact pair 228, Fig. 33.

From conductor 191 connected to battery y is derived a conductor 192 (Figs. 33 and 34) joined to conductor 280 extending to commutator switch z, being connected to contact 231' of contact pair 231, a conductor 281 being derived from contact 231'' and leading to switch h', left side, Fig. 5, where it is connected to contact 25' of pair 25, from the other contact 25'' of which is derived a conductor 282 connected to contact 25' of switch h', right side. Conductor 283 is derived from contact 25'' and extends to contact 186' of contact pair 186 corresponding to sequence switch r, Figs. 27 and 34, said pair of contacts 186 being connected by knife 185 when sequence switch r is in the position shown in full lines in Fig. 27.

A conductor 284 extends from contact 186'' and is joined to said conductor 211 which, as mentioned when referring to switch t, extends to coil 212 of motor p.

A conductor 285 is derived from conductor 273 (Fig. 33) and connected to one of the ends of the coil of electromagnet 239 on commutator switch z, from the other end of which is derived a conductor 286 extending to contact 234' of contact pair 234 of commutator switch z, the other contact 234'' of which is grounded by means of conductor 287.

A conductor 288 is branched from said conductor 192 leading from battery y, conductor 288 entering commutator switch z where it is connected to contact 233' of contact pair 233, a conductor 289 extending from contact 233'' of the same pair and being joined to conductor 209 derived from switch h'.

As stated before, conductor 277 extends from terminal 276 of rotor 275 of motor p, said conductor 277 being joined to conductor 290 connected in commutator switch z to contact 235' of pair 235, the other contact 235'' of which has connected thereto a conductor 291 attached to one of the ends of the coil of electromagnet 238 of commutator switch z, the opposite end of said coil being grounded by means of conductor 292.

A conductor 293 is branched from conductor 211, Fig. 27, and in turn conductor 294 is branched from conductor 284, said conductors 293 and 294 being joined into a conductor 295 extending to contact 188' of the pair of contacts 188 of switch s, from the other contact 188'' of which is derived a conductor 296 divided into two branches 297 leading to electromagnets m, Fig. 34, of wheels e, the other end of said electromagnets being grounded through conductor 298.

Conductor 210 has also joined thereto said conductor 213 extending to contact 190' of the pair of contacts 190 of sequence switch t, Figs. 27 and 34. Said pair of contacts 190 are connected upon the interposition of knife or blade 168 of sequence switch t when the latter assumes the position shown in full lines in Fig. 27. A conductor 299 extends from contact 190" of said pair 190, to indicator lamp 147, the other pole of which is grounded through conductor 300, Fig. 34.

*Operation*

With the vehicle running, when a deflation occurs in any of the road-wheels *b*, the fall in pressure in inner tube 4 allows the displacement of stem 6 of device *f* with stud 13 thereof, from the position shown in full lines in Fig. 2 to the dotted-line position 13', in which said stud 13 revolving with the wheel strikes lever 14 of switch *g*, moving same to the position 14''' or 14'''', Fig. 3, thereby closing the circuit *ab* corresponding to the alarm device *aa* formed by sound device 198 and electric lamp 197.

Said circuit *ab* comprises conductor 191 extending from battery *y*, and conductors 192 and 193, the latter leading in two branches to the respective switches *g*, said alarm members 198 and 197 being grounded and connected by means of branches of conductors 194 and 195.

The actuation of the alarm device warns the driver that a pneumatic failure has occurred in one of the main wheels, thus enabling said driver to reduce the speed or stop the vehicle.

However, such failure will not involve danger, as the auxiliary wheels associated with the main wheels will be automatically rendered operative.

In fact, upon stud 13 reaching position 13" shown in Fig. 2, it will strike lever 15 of switch *h* (Fig. 4) displacing said lever to the position 15''' or 15'''' thereby closing the operative circuit *ac* of said road-wheels. Starting from live pole 191, said circuit comprises conductors 192 and 204, the latter leading in two branches to the respective switches *h*, a conductor 77 extending from each switch *h*, connected to each other through conductor 207. As shown in Figs. 11, 13 and 34, by means of an annular contact 74, said conductor 77 connects input brush 72 of electromagnet *i*, which will attract movable core 65, the stem 65' of which will engage crown 67 by means of fin 66, thereby engaging frame *b'* of wheel *b* with the body of said electromagnet *i* which is angularly displaced in view of the fact that it is radially mounted on tubular shaft 63. Since said tubular shaft rotates with the body of electromagnet *i*, pinion 62 of said shaft actuates gear 61 secured to disc 56, this constituting the rotary shaft for the auxiliary wheel *d*, and therefore upon said disc turning 180°, it will cause said auxiliary wheel to pass from the inoperative position shown in full lines in Figs. 11 and 12, to the operative position indicated in dotted lines in the same figures.

When tooth 95 reaches space 94 of device *k*, it will be held between lugs 92 and 93, so that the operative position of wheel *d* is held after a braking action caused by the deflection of bow 91, the shoe 96 or 97 of which, having contacted the inner face of cap 88. At the same time, tooth 79 strikes lug 82 (Figs. 15, 16 and 17) thereby displacing lever 80 to either of the positions shown in Fig. 15, so interrupting circuit *ac*. Said circuit is grounded by means of conductors 206 and 78 having interpolated switch *j*, conductor 78 extending from electromagnet *i* through annular contact 75 and the corresponding brush 73, Figs. 11, 13 and 34.

While the setting of wheel *d* takes place rapidly, the shift is smooth, due to the reduction obtained in view of the number of teeth on driving pinion 62 relative to driven gear 61.

When in operative position, supplementary wheels *d* are located with a slight downward eccentricity relative to the main wheels *b*, therefore they fully replace the latter wheels which remain raised from the ground.

Once a jack has been applied and the main wheel *b* has been removed for repair, the supplementary wheels *d* may be readily returned to their inoperative position, even though this requires a manual action. Thus, it will be sufficient to insert a suitable tool through any of the openings 101 or 102 so causing tooth 95 to come out of engagement with lugs 92 or 93, so that disc 56 may be brought to the position shown in full lines in Figs. 11 and 12. But before doing so, it will be necessary to place lever 80 of switch *j* in its normal position, whereby core 65 of electromagnet *i* will be removed from the outer face of core body 49. Disc 56 is then manually rotated 180° and at this time lever 15 of switch *h* is again placed in its normal position shown in full lines in Fig. 4, thereby interrupting the circuit *ac* of electromagnet *i*. Core 65 driven by spring 70 will then engage notch 71 determining the inoperative position of said wheel *d*, and after placing switch *g* in intermediate position (full lines in Fig. 3) the entire system, both mechanical and electrical, becomes normal so that, after the main wheel *b* is replaced, the latter will function in the usual manner, while the auxiliary wheel will remain retracted in readiness for a further case of emergency.

With the vehicle running, if a deflation occurs in one of the driving wheels *c*, the corresponding automatic device *f* will operate, as the depression in inner tube 4 will allow the displacement of stem 6 so that when the stud 13 thereof reaches the position 13', it will strike lever 14 of the respective switch *g*, Fig. 3, displacing said lever towards one of the positions 14''' or 14''''. This will close the alarm circuit *ad* which is the same as alarm circuit *ab* but with further conductors corresponding to the driving wheels.

In this case the alarm circuit *ad*, Fig. 34, starting from live pole 191, comprises conductor 200 divided into two branches 201 and extending to the respective switches *g* of wheels *c*. A conductor branch 202 extends from each switch *g*, said branches 202 being joined to lead-in conductor 196 of alarm device *aa*, formed by lamp 197 and sound device 198, by means of conductor 203. Thus, as in the case of the road-wheels, the actuation of switch *g* will light lamp 197 and operate said sound device 198, thereby warning the driver regarding the failure.

In order to avoid the noise disturbance, said sound device 198 may be disconnected by opening switch 199.

In this case the failure also does not involve danger, as when said stud 13 reaches the position 13" shown in Fig. 2, through rotation of wheel *c*, it will displace lever 15 of switch *h'* which, in the position 15''' or 15'''', will close the circuit *af* corresponding to the automatic operation of auxiliary wheels *e*. Starting from the live pole 191, said circuit *af* comprises conductor 200 divided into a pair of branches 201 each joined to a branch conductor 208 extending to switches *h'*, Fig. 5. A conductor 209 extends from each switch *h'*, said conductors 209 being joined with conductor 210 from contact 189' of the pair of contacts 189 of sequence switch *t*, Fig. 27; from contact 189'' connected to contact 189' by means of knife or blade 167, conductor 211 extends to one of the ends of winding 212 of motor *p*, to the other end of which is connected conductor 213 leading to commutator switch z where, as already stated, it is connected to contact 229' of pair 229, Fig. 33; said contact 229', having interposed blade 267 of commutator member zc, is connected to contact 229'' from which conductor 273 extends to terminal 274 of rotor 275 of motor p, Fig. 34, a conductor 277 extending from the opposite terminal 276 of said rotor, passing by contacts 232, Fig. 33, through blade 269 of member zc, and being grounded by means of conductor 278.

Figure 25:
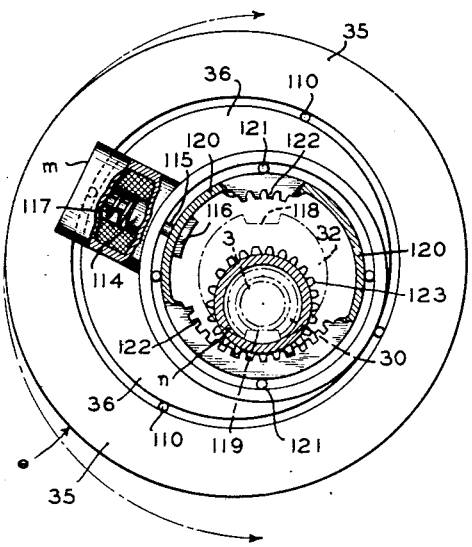
Fig. 25 is an arbitrary schematic view showing the manner in which the control cylinder, for setting in operation or retracting the auxiliary driving wheel, receives and transmits the action of a drive gear. This view shows the time in which the displacement is being effected, viz; at a point between the operative and inoperative positions.

With this circuit which, as already stated, is closed automatically through the action of device f on switch h', when lever 15 is in position 15''' or 15'''', motor p will be started, and through shaft 132, Fig. 6, and pinions 131, said motor will rotate gears 124 corresponding to tubular shafts n and n'. Through pinion 123, Figs. 19, 22 and 25, said tubular shafts n and n' will actuate the respective gears 122 integral with cylinder 120.

The connection established by switch h' due to said action of lever 15 will also close the circuit of electromagnets m, said circuit comprising, starting from switch h', conductor 209 (Fig. 34) joined to conductor 210, and since sequence switches r, s and t, Fig. 27, are in the position shown in dotted lines, said conductor 210 is connected with conductor 211 through sequence switch t. Conductor 293 extends from said conductor 211 and is joined to conductor 295 which through sequence switch s is connected with conductor 296 divided into two branches 297 leading to the coil of electromagnets m of each wheel e, said coil being grounded by means of conductor 298, Fig. 34.

Thus, at the same time the mechanical elements operate so as to rotate cylinder 120, the electromagnet m of each wheel e will also function, as it will attract core 114 (Figs. 19, 22 and 25) whereby the contact face 116' of shoe 116 will engage said cylinder 120, which will act as a driving cylinder and cause the displacement of the entire body 36 where electromagnet m is mounted. This will cause the change in position of wheel e, as said body will act as shaft for said wheel e and in rotating with rollers 109 about core 32, will shift wheel e from an eccentric to a concentric position relative to the main wheel c, so that both wheels e and c will be substantially at the same level.

Inasmuch as this displacement of wheels e is effected while slider q is displacing from the position q' shown in dotted lines to the position q'' shown in Fig. 27, at the time said slider passes from position q'' to position q''' it will cause the reversal of sequence switch s which will assume the position shown in full lines and open the circuit of electromagnets m; thus, spring 117 will engage shoe 116 in notch 119 defining the position of wheel e so that the latter will operate either in place of or together with wheel c. The operative position is defined by stop 129 limiting the displacement of body 36.

Slider q, which as stated hereinbefore is responsive to the action of screw-threads 137 of tubular shaft n, apart from actuating sequence switches r, s and t, during the movement thereof from position q' to position q'''' (Fig. 27) will at the same time actuate pump w which during the first portion of the displacement of slider q will impose a preparatory pressure on the fluid, while wheels e are being shifted from the inoperative position to the operative position. During the final portion of its movement, slider q will cause the necessary piston action so that the liquid contained in pump w will flow through tubular conduits 142 to the driving devices u, causing the displacement of the respective pistons 144 which through stem 145 will effect the clutching x. Thus, through the action of devices u, said drum v will be displaced, the friction ring 155 of said drum being connected with friction ring 156 of annular band 35' constituting the rotary frame of wheel e proper. Through this clutch x the rotation of wheels c will be reflected on the respective companion wheel e, so that both wheels c and e will rotate together.

At the end of the stroke of slider q towards position q'''' (Fig. 27) said switch t will be reversed, and the latter, in passing to the position shown in full lines in said Fig. 27, will withdraw blade 167, opening the circuit of motor p thereby stopping all mechanical movement therefrom, after rendering wheels e operative, clutching same and reversing the switches.

The reversal of sequence switch t to the position shown in full lines in Fig. 27, closes circuit ai corresponding to the indicator lamp 147, Fig. 34, disclosing that the driving auxiliary equipment is operating.

With this automatic setting of wheels e, the vehicle will remain ready to run on said wheels, which in this instance will replace wheels c which are deflated.

This emergency condition cannot be modified until switch h' is placed in normal position upon removing the main wheel c for repair, since switch h' actuated by said automatic device f will hold open the circuit ag corresponding to the retraction of the auxiliary driving wheels.

Switches h' and g should be returned to their normal position after wheel c has been removed for repair. When in such normal position, shown in dotted lines in Fig. 5, the end 15'' of lever 15 will connect the pair of contacts 25, preparing circuit ag so that when actuating interpole member ac of commutator switch z is put into action, it will close the circuit for retracting the auxiliary driving wheels e.

Starting from live pole 191 of battery y, said circuit (Fig. 34) comprises conductor 192 joined to conductor 280, which through the pair of contacts 231 of commutator switch z, Fig. 33, extends along with conductor 281 leading to switch h' corresponding to the left-hand portion, Figs. 5 and 34. Said left-hand switch h' is in series with the similar switch shown on the right side, as conductor 282 extends from the pair of contacts 25 of switch h' (left) and is connected with contact 25' of the pair of contacts 25 of switch h' of the right-hand side, conductor 283 extending from contact 25'' to sequence switch r. In said switch r, conductor 283 is connected to contact 186' of the pair of contacts 186, a conductor 284 leading from contact 186'' and being joined to conductor 211 which, as already stated, is connected to one end of winding 212 of motor p. Conductor 213 extends from the other end of said winding to commutator switch z, wherein it is connected to contact 228' of the pair of contacts 228, from the other contact 228'' of which extends a conductor 279 joined to conductor 277 leading to terminal 276 of rotor 275 of motor p. From the other terminal 274 of said rotor, Fig. 34, conductor 273 extends back to commutator switch z (Fig. 33) where it is connected to conductor 285 joined to one end of the coil of electromagnet 239, while conductor 286 extends from the other end of said coil and is connected to contact 234' of the pair of contacts 234, the other contact 234'' of which is grounded through conductor 287.

When in normal position, shown in full lines in Fig. 5, said right-hand and left-hand switches $h'$ are also in the circuit of electromagnets $m$ which, starting from one of said switches, i. e. the left-hand switch, comprises (Fig. 34) conductor 282, contacts 25 of switch $h'$ (right), conductor 283, contacts 186 of sequence switch $r$, conductors 284, 294 and 295, which through contacts 188 of sequence switch $s$ continue through conductor 296 divided into two branches 297, connected to the respective electromagnets $m$ of each wheel $e$. On the other hand, said electromagnets $m$ are grounded by means of conductor 298. With these circuits, when commutator member $zc$ of commutator switch $z$ is moved to the position $zc'$, knives or blades 267, 268 and 269 will be interposed between the pairs of contacts 228, 234 and 231, thereby closing circuit $ag$ starting motor $p$ in a direction contrary to that necessary for rendering the auxiliary wheels operative.

This position of member $zc$ in commutator switch $z$ is secured by means of ball 252, held by lever $zb$, due to the fact that in the same circuit $ag$ the electromagnet 239 (Fig. 30) is interpolated, which through core 239' holds the end 256 of said lever $zb$.

With this operation of motor $p$, through shaft 132 and pinions 131, said tubular shafts $n$ and $n'$ are actuated by means of the respective gears 124. Through the screw-threads 137 thereof, tubular shaft $n$ will cause the displacement of slider $q$ which during the stroke from $q''''$ to $q'''$ (Fig. 27) will cause a depression in pump $w$, sufficient to reduce the pressure in driving devices $u$, so that the tension of springs 149 will prevail. Said springs will then return drum $v$ to the inoperative position shown in Figs. 19 and 20, thereby unclutching clutch $x$. During this stroke from position $q''''$ to position $q'''$ of slider $q$, the member 146 thereof will actuate sequence switch $t$ to the position shown in dotted lines in Fig. 27, so as to prepare the circuit for a future operation of wheels $e$. At the same time it will open circuit $ai$ of indicator lamp 147.

During the stroke from position $q'''$ to $q''$, slider $q$ will actuate sequence switch $s$, thereby closing the circuit of electromagnets $m$ which will connect shoe 116 with cylinder 120, the gear 122 of which is meshed with the respective pinion 123 corresponding to tubular shaft $n$ or $n'$ and so operates as a driving cylinder which moves body 36 to the inoperative position. Said inoperative position is reached when slider $q$ assumes the position $q'$, in which it actuates sequence switch $r$ and opens circuit $ag$, thereby stopping motor $p$ and therefore the mechanical action, and as a result of the opening of sequence switch $r$, the circuit of electromagnets $m$ is also interrupted; this enables spring 117 to engage shoe 116 in notch 118 determining said inoperative position, defined by the limitation of stop 125. The interruption of circuit $ag$ renders electromagnet 239 inoperative, Fig. 30, releasing lever $zb$ in the commutator switch, whereby actuating member $zc$ will come out of engagement with ball 252 due to the tension of opposed springs 270 and 271, which move said member to the intermediate position shown in full lines in Fig. 30, thus remaining in circuit $af$ corresponding to the automatic setting.

Should the ground on which the vehicle be running not afford sufficient adhesion, or if for any other reason it should be considered advisable to have the auxiliary wheels $e$ cooperate with the main driving wheels $c$, this may be easily effected by the driver through a simple actuation of commutator switch $z$.

For this purpose, said commutator member $zc$ should be moved to the position $zc''$ shown in Fig. 30, whereby blades 267, 268 and 269 will be interposed between the pairs of contacts 230, 235 and 233, thus closing the circuit $ah$ which is the main circuit for operation at will.

Starting from the live pole 191, said circuit $ah$ comprises conductor 192 which by means of conductor 288 extends to commutator switch $z$ where through the pair of contacts 233, Fig. 33, it continues through conductor 289 which, without passing through switches $h'$, is connected to conductor 209, Fig. 34, which is then joined with conductor 210 to continue by the same means of circuit $af$ corresponding to the automatic setting.

The position $zc''$ of commutator lever $zc$, Fig. 30, is equivalent to the closure of the main circuit which, similarly to circuit $af$, is closed by switch $h'$ left or right. Thus, the movement of member $zc$ of commutator switch $z$ to said position $zc''$, will cause the same effect on motor $p$, electromagnets $m$ and associated mechanisms, as that resulting from devices $f$ upon actuating any of said switches $h$ and $h'$.

Therefore, when the driver shifts member $zc$ of commutator switch $z$ to the position $zc''$, motor $p$ will be started, actuating gears 124 of tubular shafts $n$ and $n'$ through shaft 132 and pinions 131. By means of pinion 123, Figs. 19, 22 and 25, said tubular shafts will actuate gears 122 the cylinder 120 of which will act as a driving cylinder for the displacement of body 36, since upon the closure of the circuits of electromagnets $m$, shoes 116 will engage the inner face of said cylinder 120. After wheel $e$ has been rendered operative, the clutching action will take place, originally responsive to the stroke of slider $q$, whereby said auxiliary wheel $e$ will become a driving wheel together with wheel $c$, as in the case of the automatic setting, but in this case wheel $e$ will act as a complementary wheel, so that both wheels will bear the load of the vehicle and afford a larger adherence surface so as to avoid skidding.

The adherence of the driving pair of wheels may be increased by providing the tread of auxiliary wheel $e$ with suitable anti-skid means.

The closure of circuit $ah$ will cause electromagnet 238 to hold lever $za$ in the commutator switch $z$ securing said ball 242, so that it will effectively hold commutator member $zc$ in said position $zc''$.

Thus, whether commutator lever $zc$ is brought to position $zc'$ or $zc''$, it will be held by the same circuit closed thereby when in such positions; when in position $zc'$ member $zc$ will be held through the influence of electromagnet 239, and when in position $zc''$ it will be held by the influence of electromagnet 238, in both instances until auxiliary wheel $e$ has been displaced, since as explained above, when slider $q$ reaches the position $q''''$, Fig. 27, sequence switch $t$ will assume the position indicated in full lines, opening circuit $ah$ in which electromagnet 238 of the commutator switch is also inserted, said electromagnet releasing lever $za$, allowing springs 270 and 271 to shift said commutator member $zc$ to the intermediate position indicated in full lines in Fig. 30, where it will prepare the connections for the automatic circuit $af$.

Whenever the driver deems it advisable, he will be able to return wheels *e* to inoperative position, merely by moving lever *zc* of the commutator switch to the position *zc'* (Fig. 30), thereby closing the circuit *ag* corresponding to the retraction at will of said wheels, as already explained.

For certain types of vehicles, said auxiliary wheels *e* may be mounted as shown in Fig. 10, viz; from a great eccentricity to a small eccentricity relative to the main wheels *c*, so that in rendering wheels *e* operative, they will fully replace wheels *c*, as the latter will remain spaced from the surface of the ground or road, as explained in describing wheels *b* and *d*.

The mounting of wheels *e* as shown in Fig. 10 will enable the application of the system to vehicles in which the main driving wheels *c* are provided with rigid fins, such as vehicles for country use, while the auixiliary wheels *e* are suitable for paved roads.

It should be understood that changes, modifications and alterations may be made by those skilled in the art, without departing from the scope of the invention, as set forth in the appended claims.

I claim:

1. An emergency wheel equipment for vehicles in general, comprising an auxiliary wheel adjacent at least one of the main wheels of said vehicle, the rotation shaft of said auxiliary wheel being constituted by a body through which the axle of the respective main wheel extends, said body being variably mounted with means for selectively displacing said auxiliary wheel from an inoperative position to an operative position and vice-versa, a gear on said body, associated with a pinion, the shaft of said pinion having a radial arm carrying an electromagnet having a pair of switches in the circuit thereof, said electromagnet being provided with a mechanical clutch member engageable with a crown on said main wheel, said member and crown while engaged serving to place said auxiliary wheel in operative position during running of the vehicle, one of said switches having a circuit closing member actuated by means capable of being operated by a stud on an automatic device functionally associated by means of a spring member with the tire of said main wheel, said automatic device being materially independent from said tire and fluid content therein, the other of said switches having a circuit opening member provided with actuating means capable of being operated by a projection on said body.

2. An emergency wheel equipment for vehicles in general, comprising an auxiliary wheel adjacent at least one of the main wheels of said vehicle, the rotation shaft of said auxiliary wheel being constituted by a body through which the axle of the respective main wheel extends, said body being variably mounted with means for selectively shifting said auxiliary wheel from an inoperative position to an operative position and vice-versa, said means for shifting said auxiliary wheel comprising a reversible electric motor, said auxiliary wheel having a friction ring forming a clutch with a further friction ring arranged on a drum displaceable in a direction parallel to the axle of the main wheel but slidably locked relative to the frame of said wheel, said drum being spring-urged towards the inoperative position thereof, said drum being provided with means capable of carrying said friction ring on said drum into clutching engagement with said friction ring on said auxiliary wheel when this has been shifted into said operative position, said clutch operating means being coupled to a secondary transmission, the latter transmission being in turn coupled to a transmission powered by said electric motor.

3. Emergency equipment for vehicles having ground engaging wheels carried by axles, comprising an auxiliary wheel adjacent each of at least two ground engaging wheels and spaced laterally therefrom, a hub for each auxiliary wheel mounted eccentrically with respect to each axle, means mounting each auxiliary wheel on each hub for movement of said auxiliary wheel from an inoperative position considerably eccentric to each ground engaging wheel and out of contact with the ground to an operative position different in respect to said axle and ground engaging wheel and in contact with the ground, means for moving each auxiliary wheel from inoperative to operative position, a fluid pressure tire on each ground engaging wheel having an adjacent auxiliary wheel, fluid pressure responsive means associated with each ground engaging wheel having an adjacent auxiliary wheel, a control power line connected with said fluid pressure responsive means and with said means for moving said auxiliary wheel whereby upon a predetermined reduction in pressure in at least one of said tires said means for moving said auxiliary wheel will be actuated to move at least the associated auxiliary wheel from inoperative to operative position to assume the associated axle load of said vehicle.

4. Emergency equipment for vehicles having ground engaging wheels carried by axles, comprising an auxiliary wheel adjacent each of at least two ground engaging wheels and spaced laterally therefrom, a hub for each auxiliary wheel mounted eccentrically with respect to each axle, means mounting each auxiliary wheel on each hub for movement of each auxiliary wheel from an inoperative position considerably eccentric to each gound engaging wheel and out of contact with the ground to an operative position different in respect to said axle and ground engaging wheel and in contact with the ground, means for moving each auxiliary wheel from inoperative to operative position and from operative to inoperative position, manual remote control means, a control power line connected with said manual remote control means and with said means for moving said auxiliary wheel whereby upon certain actuation at will of said manual remote control means said means for moving said auxiliary wheel will be actuated to move at least one of said auxiliary wheels to operative position to at least partly assume the associated axle load of said vehicle, and whereby upon another certain actuation at will of said manual remote control means said means for moving said auxiliary wheel will be actuated to move said auxiliary wheel from operative position to inoperative position.

5. Emergency equipment for vehicles having ground engaging wheels carried by axles, comprising an auxiliary wheel adjacent each of at least two ground engaging wheels and spaced laterally therefrom, a hub for each auxiliary wheel mounted eccentrically with respect to each axle, means mounting each auxiliary wheel on each hub for movement of each auxiliary wheel from an inoperative position considerably eccentric to each ground engaging wheel and out of contact with the ground to an operative position different in respect to said axle and ground engaging wheel and in contact with the ground, means for moving each auxiliary wheel from inoperative to operative position and from operative to inoperative position, a fluid pressure tire on each ground engaging wheel having an adjacent auxiliary wheel, fluid pressure responsive means associated with each ground engaging wheel having an adjacent auxiliary wheel, manual remote control means, a control power line connected with said fluid pressure responsive means and with said manual remote control means and with said means for moving said auxiliary wheel whereby upon a predetermined reduction in pressure in at least one of said tires said means for moving said auxiliary wheel will be actuated to move at least the associated auxiliary wheel from inoperative to operative position to assume the associated axle load of said vehicle, and whereby upon a certain actuation at will of said manual remote control means said means for moving said auxiliary wheel will be actuated to move at least one of said auxiliary wheels to operative position to at least partly assume the associated axle load of said vehicle, and whereby upon another certain actuation at will of said manual remote control means said means for moving said auxiliary wheel will be actuated to move said auxiliary wheel from operative position to inoperative position.

6. Emergency equipment for vehicles having ground engaging wheels carried by axles, comprising an auxiliary wheel adjacent each of at least two ground engaging wheels and spaced laterally therefrom, a hub for each auxiliary wheel mounted eccentrically with respect to each axle, means rotatably mounting each auxiliary wheel on each hub for movement from an inoperative position eccentric to each ground engaging wheel and out of contact with the ground to a position concentric with each ground engaging wheel and in contact with the ground, power operated means for moving each auxiliary wheel from inoperative to operative position and from operative to inoperative position, a fluid pressure tire on each ground engaging wheel having an adjacent auxiliary wheel, fluid pressure responsive means associated with each of said ground engaging wheels, a control circuit connected with said fluid pressure responsive means and with said power operated means whereby upon a predetermined reduction in pressure in at least one of said tires said power operated means will be actuated to move at least the associated auxiliary wheel from inoperative to operative position to assume the associated axle load of said vehicle, and manual remote control means connected with said control circuit whereby at least one auxiliary wheel may be moved from inoperative to operative position or from operative to inoperative position at will.

7. Emergency equipment for vehicles having ground engaging wheels carried by axles, comprising an auxiliary wheel adjacent each of at least two ground engaging wheels and spaced laterally therefrom, a hub for each auxiliary wheel mounted eccentrically with respect to each axle, means rotatably mounting each auxiliary wheel on each hub for movement from an inoperative position eccentric to each ground engaging wheel and out of contact with the ground to an operative position concentric with each ground engaging wheel and in contact with the ground, means for moving each auxiliary wheel from inoperative to operative position and from operative to inoperative position, a pneumatic tire on each ground engaging wheel having an adjacent auxiliary wheel, fluid pressure responsive means associated with each of said ground engaging wheels, a control circuit connected with said fluid pressure responsive means and with said auxiliary wheel moving means whereby upon a predetermined reduction in pressure in at least one of said tires said auxiliary wheel moving means will be actuated to move said auxiliary wheel from inoperative to operative position to assume the associated axle load of said vehicle, and manual control means connected with said control circuit whereby each auxiliary wheel may be moved from inoperative to operative position or from operative to inoperative position at will.

8. Emergency equipment for vehicles having ground engaging wheels carried by axles, comprising an auxiliary wheel adjacent each of at least two ground engaging wheels and spaced laterally therefrom, a hub for each auxiliary wheel mounted eccentrically with respect to each axle, means rotatably mounting each auxiliary wheel on each hub for movement from an inoperative position eccentric to each ground engaging wheel and out of contact with the ground to an operative position concentric with each ground engaging wheel and in contact with the ground, means for clutching auxiliary wheels in driving engagement with the corresponding main wheel upon movement of said auxiliary wheels from inoperative to operative position, power operated means for moving said auxiliary wheels from inoperative position to operative position and from operative to inoperative position, a pneumatic tire on each ground engaging wheel having an adjacent auxiliary wheel, fluid pressure responsive means associated with each of said ground engaging wheels, a control circuit connected with each fluid pressure responsive means and with said power operated means whereby upon a predetermined reduction in pressure in at least one of said tires said power operated means will be actuated to move the associated auxiliary wheel from inoperative to operative position to assume the associated axle load of said vehicle, and manual control means connected with said control circuit whereby each auxiliary wheel may be moved from inoperative position to operative position or from operative to inoperative position at will.

9. Emergency equipment for vehicles having ground engaging wheels carried by axles, comprising an auxiliary wheel adjacent each of at least two ground engaging wheels and spaced laterally therefrom, a hub for each auxiliary wheel mounted eccentrically with respect to each axle, means rotatably mounting each auxiliary wheel on each hub for movement from an inoperative position out of contact with the ground to an operative position concentric with each ground engaging wheel and in contact with the ground, power operated means for moving each auxiliary wheel from inoperative to operative position and from operative to inoperative position comprising a reversible motor, a control shaft, a clutch for connecting said motor and said control shaft, means provided with gears between said control shaft and said auxiliary wheel for moving said auxiliary wheel from inoperative to operative position and from operative to inoperative position, engagement means between said auxiliary wheel and said geared means, a solenoid for actuating said engagement means, a pneumatic tire on each ground engaging wheel having an adjacent auxiliary wheel, fluid pressure responsive means associated with each of said ground engaging wheels, a control circuit connected with said fluid pressure responsive means and with said solenoid whereby upon a predetermined reduction in pressure in at least one of said tires said power operated means will be actuated to move said associated auxiliary wheel from inoperative to operative position to assume the associated axle load of said vehicle, and manual control means connected with said control circuit and with said solenoid whereby at least one auxiliary wheel may be moved from inoperative to operative position or from operative to inoperative position at will.

10. Emergency equipment for vehicles having ground engaging wheels carried by axles, comprising an auxiliary wheel adjacent each of at least two ground engaging wheels and spaced laterally therefrom, a hub for each auxiliary wheel mounted eccentrically with respect to each axle, means rotatably mounting each auxiliary wheel on each hub for movement from an inoperative position eccentric to each ground engaging wheel and out of contact with the ground to an operative position concentric with each ground engaging wheel and in contact with the ground, power operated means for moving each auxiliary wheel from inoperative to operative position and from operative to inoperative position comprising a reversible motor, a control shaft, a clutch for connecting said motor and said control shaft, means provided with gears between said control shaft and said auxiliary wheel for moving said auxiliary wheel from inoperative to operative position and from operative to inoperative position, engagement means between said auxiliary wheel and said geared means, a solenoid for actuating said engagement means, a pneumatic tire on each ground engaging wheel having an adjacent auxiliary wheel, fluid pressure responsive means associated with each of said ground engaging wheels, a control circuit connected with said fluid pressure responsive means and with said power actuated means whereby upon a predetermined reduction in pressure in at least one of said tires said power operated means will be actuated to move the associated auxiliary wheel from inoperative to operative position to assume the associated axle load of said vehicle.

11. Emergency equipment for vehicles having ground engaging wheels carried by axles, comprising an auxiliary wheel adjacent each of at least two ground engaging wheels and spaced laterally therefrom, a hub for each auxiliary wheel mounted eccentrically with respect to each axle, means rotatably mounting each auxiliary wheel on each hub for movement from an inoperative position eccentric to each ground engaging wheel and out of contact with the ground to an operative position concentric with each ground engaging wheel and in contact with the ground, means for locking certain of said auxiliary wheels in driving engagement with each axle upon movement of each auxiliary wheel from inoperative to operative position, power operated means for moving each auxiliary wheel from inoperative to operative position and from operative to inoperative position comprising a reversible motor, a control shaft, a clutch for connecting said motor and said control shaft, means provided with gears between said control shaft and said auxiliary wheel for moving said auxiliary wheel from inoperative to operative position and from operative to inoperative position, engagement means between said auxiliary wheel and said geared means, a solenoid for actuating said engagement means, a pneumatic tire on each ground engaging wheel having an adjacent auxiliary wheel, fluid pressure responsive means associated with each of said ground engaging wheels, a control circuit connected with said fluid pressure responsive means and with said power operated means whereby upon a predetermined reduction in pressure in at least one of said tires said power operated means will be actuated to move the associated auxiliary wheel from inoperative to operative position to assume the associated axle load of said vehicle, and manual control means connected with said control circuit whereby at least one auxiliary wheel may be moved from inoperative to operative position or from operative to inoperative position at will.

12. Emergency equipment for vehicles having ground engaging wheels carried by axles, comprising an auxiliary wheel adjacent each of at least two ground engaging wheels and spaced laterally therefrom, a hub for each auxiliary wheel mounted eccentrically with respect to each axle, means rotatably mounting each auxiliary wheel on each hub for movement from an inoperative position eccentric to each ground engaging wheel and out of contact with the ground to an operative position concentric with each ground engaging wheel and in contact with the ground, power operated means for each auxiliary wheel from inoperative to operative position and from operative to inoperative position comprising a reversible motor, a control shaft, a clutch for connecting said motor and said control shaft, geared means between said shaft and said auxiliary wheel, and engagement means between said auxiliary wheel and said geared means, a solenoid for actuating said engagement means, a control circuit connected with said solenoid, and manual control means connected with said control circuit whereby at least one auxiliary wheel may be moved from inoperative to operative position or from operative to inoperative position at will.

13. Emergency equipment for vehicles having ground engaging wheels carried by axles, comprising an auxiliary wheel adjacent each of at least two ground engaging wheels and spaced laterally therefrom, a hub for each auxiliary wheel mounted eccentrically with respect to each axle, means rotatably mounting each auxiliary wheel on each hub for movement from an inoperative position eccentric to each ground engaging wheel and out of contact with the ground to an operative position concentric with each ground engaging wheel and in contact with the ground, certain of said axles being power driven, means for moving each auxiliary wheel from inoperative to operative position and from operative to inoperative position, means for clutching said ground engaging wheels on said power driven axles to the associated auxiliary wheels when in operative position, clutch actuating means, a pneumatic tire on said powered ground engaging wheels, fluid pressure responsive means associated with each of the last said ground engaging wheels, a control circuit connected with said fluid pressure responsive means and with said clutch actuating means whereby upon a predetermined reduction in pressure in at least one of said tires said auxiliary wheel moving means will be actuated to move the associated auxiliary wheel from inoperative to operative position to assume the functions of said power driven ground engaging wheel, and manual control means connected to said control circuit whereby at least one auxiliary wheel may be moved from inoperative to operative position or from operative to inoperative position at will.

14. Emergency equipment for vehicles having ground engaging wheels carried by axles, comprising an auxiliary wheel adjacent each of at least two ground engaging wheels and spaced laterally therefrom, a hub for each auxiliary wheel mounted eccentrically with respect to each axle, means rotatably mounting each auxiliary wheel on each hub for movement from an inoperative position eccentric to each ground engaging wheel and out of contact with the ground to an operative position concentric with each ground engaging wheel and in contact with the ground, certain of said axles being power driven, means for moving each auxiliary wheel from inoperative to operative position and from operative to inoperative position, means for declutching said ground engaging wheels on said power driven axles from the associated auxiliary wheel in operative position, declutch actuating means, manual remote control means, a control circuit connected with said declutch actuating means and with said auxiliary wheel moving means and with said manual control whereby upon a certain actuation at will of said manual remote control said auxiliary wheels may be declutched and moved from operative to inoperative position.

15. Emergency equipment for vehicles having ground engaging wheels carried by axles as set forth in claim 4 wherein each auxiliary wheel travels through an arcuate path in moving from inoperative to operative position and from operative to inoperative position.

16. Emergency equipment for vehicles having ground engaging wheels carried by axles as set forth in claim 4 wherein each auxiliary wheel travels through a vertical path in moving from inoperative to operative position and from operative to inoperative position.

FEDERICO CARLOS KEMBER.

References Cited in the file of this patent

UNITED STATES PATENTS

| Number | Name | Date |
|---|---|---|
| 1,144,834 | Freeman | June 29, 1915 |
| 1,886,573 | Nelson | Nov. 8, 1932 |
| 2,057,415 | Capo | Oct. 13, 1939 |
| 2,203,774 | Cornelissen | June 11, 1940 |
| 2,273,663 | Robert | Feb. 17, 1942 |
| 2,452,688 | Schlett | Nov. 2, 1948 |
| 2,466,794 | Craig | Apr. 12, 1949 |